US009106311B2

United States Patent
Nousiainen et al.

(10) Patent No.: US 9,106,311 B2
(45) Date of Patent: Aug. 11, 2015

(54) SWITCH AND APPARATUS HAVING AT LEAST ONE SUBSCRIBER IDENTIFICATION MODULE

(71) Applicant: UROS OY, Oulu (FI)

(72) Inventors: Marko Nousiainen, Oulu (FI); Ilkka Rahikainen, Oulu (FI); Tommi Uhari, Oulu (FI); Jari A. Kokkonen, Oulu (FI)

(73) Assignee: UROS TECHNOLOGY S.À.R.L., Ettelbruck (LU)

( * ) Notice: Subject to any disclaimer, the term of this patent is extended or adjusted under 35 U.S.C. 154(b) by 29 days.

(21) Appl. No.: 13/889,669

(22) Filed: May 8, 2013

(65) Prior Publication Data
US 2013/0316766 A1   Nov. 28, 2013

(30) Foreign Application Priority Data

May 25, 2012 (EP) .................................. 12169480

(51) Int. Cl.
*H04B 1/38* (2006.01)
*H04B 1/3816* (2015.01)
*H04W 8/18* (2009.01)
*H04W 88/06* (2009.01)

(52) U.S. Cl.
CPC ............ *H04B 1/3816* (2013.01); *H04W 8/183* (2013.01); *H04W 88/06* (2013.01)

(58) Field of Classification Search
CPC .......................... H04M 1/71519; H04W 88/06
USPC .................................... 455/558, 552.1, 550.1
See application file for complete search history.

(56) References Cited

U.S. PATENT DOCUMENTS

| 7,706,839 | B2 * | 4/2010 | Ueno ............................ 455/558 |
| 8,750,931 | B2 * | 6/2014 | Park et al. ..................... 455/558 |
| 2002/0154632 | A1 | 10/2002 | Wang et al. |
| 2007/0136489 | A1 * | 6/2007 | Temoshenko et al. ........ 709/237 |
| 2010/0105433 | A1 | 4/2010 | Lin et al. |
| 2010/0240414 | A1 | 9/2010 | Lotenberg |
| 2011/0081951 | A1 * | 4/2011 | Hwang ......................... 455/558 |
| 2012/0135715 | A1 * | 5/2012 | Kang et al. ................. 455/412.1 |

FOREIGN PATENT DOCUMENTS

WO    WO 2010/140781 A2    12/2010

OTHER PUBLICATIONS

European Search Report issued in Application No. 12169480.6; Dated Aug. 3, 2012.

* cited by examiner

*Primary Examiner* — Danh Le
(74) *Attorney, Agent, or Firm* — Oliff PLC

(57) ABSTRACT

A switch operably couplable with a general controller, a plurality of subscriber identification modules, a subscriber identification module controller, and one or more radio modems, each of the one or more radio modems being configured to wirelessly communicate with at least one base station of a radio system. The switch receives control data from the general controller. The switch is capable of regulating, on the basis of the control data, one or more first couplings and one or more second couplings simultaneously, the one or more first couplings being formed between one or more subscriber identification modules and the subscriber identification module controller and the one or more second couplings being formed between one or more subscriber identification modules and the radio modems.

10 Claims, 12 Drawing Sheets

US 9,106,311 B2

SWITCH AND APPARATUS HAVING AT LEAST ONE SUBSCRIBER IDENTIFICATION MODULE

FIELD

The invention relates to apparatus having at least one SIM.

BACKGROUND

When a mobile phone is turned on, a device controller first switches a subscriber identity module (SIM) in contact with a SIM controller. The SIM controller, which is a sub-controller for the device controller, performs necessary data transfer with the subscriber identity module for authentication and wireless communication. After the data transfer, the SIM is disconnected from the SIM controller and switched in contact with a radio modem for wireless communication.

First mobile phones had one subscriber identity module card. Since then the number of SIM cards has increased. A present mobile phone may have dual or triple SIM cards. Although a number of SIMs could bring many advantages, dealing with a plurality of SIMs isn't simple. The switching between the at least one SIM and the SIM controller consumes time and increases complexity. Hence, there is a need for better solutions.

BRIEF DESCRIPTION

According to an aspect of the present invention, there is provided a apparatus as specified in claim 1.

According to another aspect of the invention, there is provided a portable apparatus specified in claim 6.

According to another aspect of the invention, there is provided a method specified in claim 12

The switch and apparatus in the presented claims are responses to the need for an easy and reliable use of SIMs in a portable device having a compact, reliable and user friendly form.

LIST OF DRAWINGS

Example embodiments of the present invention are described below, by way of example only, with reference to the accompanying drawings, in which FIG. 1 illustrates equipment with a switch capable of coupling a SIM with a transceiver and another SIM to a SIM controller simultaneously;

Figure 11:
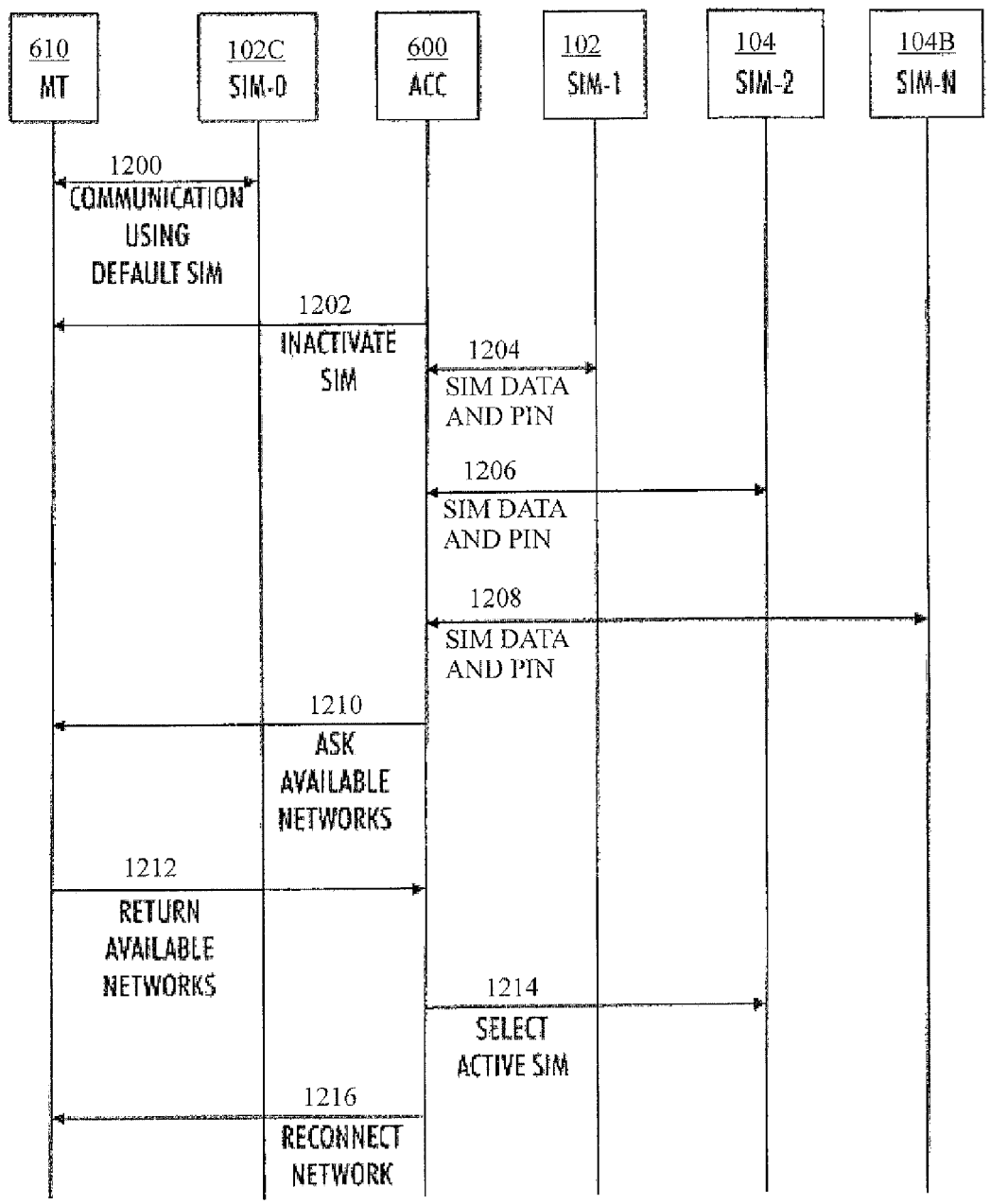
Figure 12:
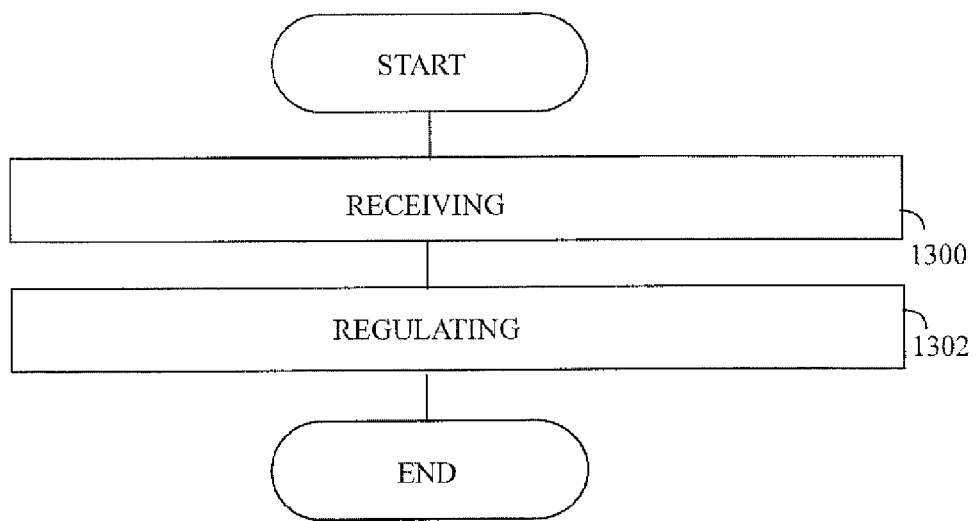

FIG. 11 presents a signalling diagram of a communication procedure between the mobile phone, the accessory and a plurality of subscriber identification modules; and FIG. 12 illustrates a flow chart of a method.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 10 illustrate various embodiments, they are simplified drawings that only show some structures and functional entities. It is apparent to a person skilled in the art that the described SIM cards and equipment may also comprise other functions and structures. It should be appreciated that details of some functions, structures, and the protocols used for communication are irrelevant to the actual invention. Therefore, they need not be discussed in more detail here.

Figure 1:
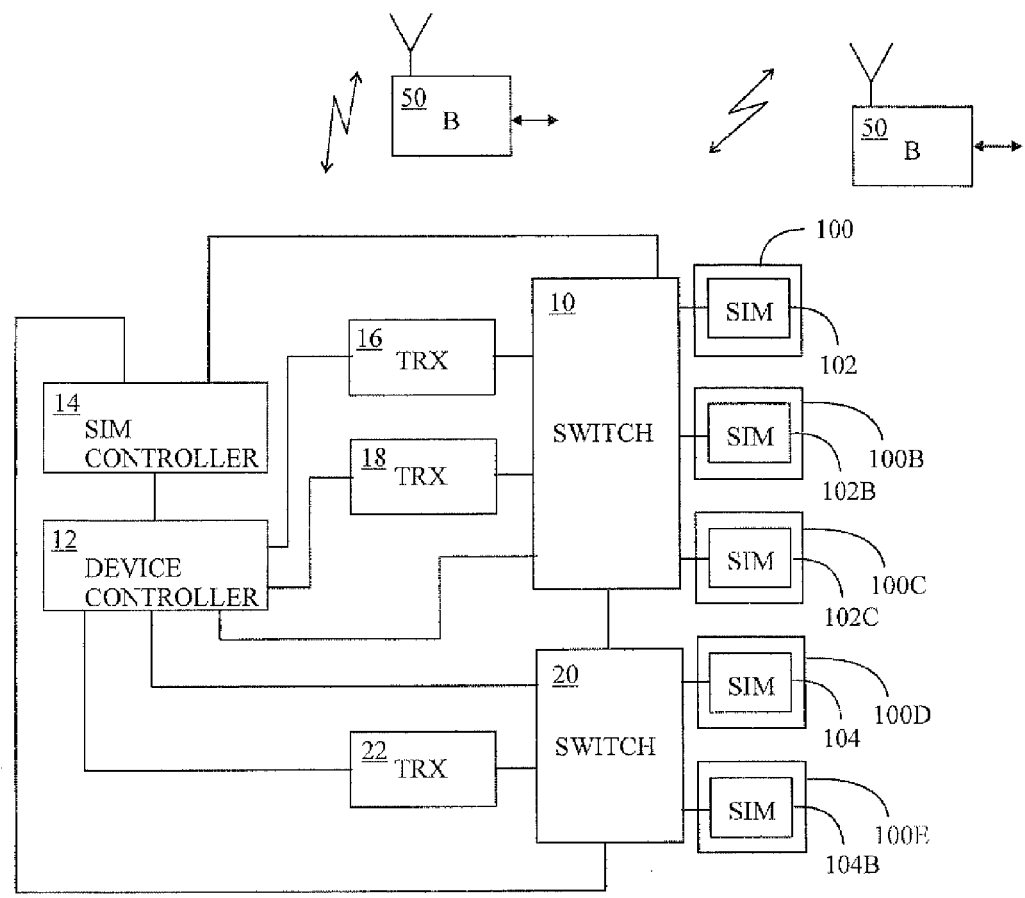

FIG. 1 shows equipment 400 which has two switches 10, 20 operably coupled with a general controller 12, a plurality of subscriber identification modules 102, 102B, 102C, 104, 104B, a subscriber identification module controller 14, and one or more radio modems 16, 18, 22. In general, the number of the switches 10, 20 in the equipment 400 may be one or more. If more than one switch is used, the switches 10, 20 may be coupled in cascade. All switches 10, 20 are structurally and operationally similar having similar connections to subscriber identification module controller 14, the general controller 12 and radio modems 16, 18, 22 and subscriber identification modules. Each subscriber identification module 102, 102B, 102C, 104, 104B may be reside in one card 100, 100B, 100C, 100D, 100E.

The SIM card 100, 100B, 100C, 100D, 100E may have the same size as prior art SIM cards. The size of the card 100 may be 85.60 mm×53.98 mm×0.76 mm, for example which is the size of a credit card. Alternatively, the card 100 may be considerably smaller, 25 mm×15 mm×0.76 mm, for example which is the size of a newer mini-SIM card. Still, the size of the card 100 may be 15 mm×12 mm×0.76 mm, for example which is the size of a micro-SIM card, is even smaller. Naturally, these measures are only examples and hence the size of the card 100 is not limited to these. It is also to be noted than one physical SIM card may include a number of different subscriptions: one SIM card may be a multi-IMSI SIM card having many different subscriber identities in the same card.

Besides being called subscriber identity module, also other names and abbreviations may be used. USIM (Universal Subscriber Identity Module) is an application for UMTS running on a UICC (Universal Integrated Circuit Card). Each USIM may be a logical entity on the card 100 storing subscriber-identity-module-specific information and other information. The stored information may include user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

Figure 2:
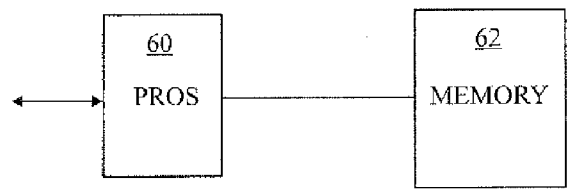
FIG. 2 illustrates a block diagram of a controller.

FIG. 2 shows a block diagram of a controller. The general controller 12 may comprise at least one processor 60 and at least one memory 62. The general controller 12 may be a link between equipment's hardware and software and the general controller 12 may control other operations of the equipment except those related to the subscriber identification module(s). The general controller 12 controls the subscriber identification module controller 14 and controls the at least one switch 10, 20 according to the computer program stored in memory.

Similar to the general controller 12 and thus illustrated with the same FIG. 2, the subscriber identification module controller 14 may comprise at least one processor 60 and at least one memory 62. The subscriber identification module controller 14 may control the operations particularly related to the subscriber identification module(s). The subscriber identification module controller 14 inquires information from the subscriber identification modules 102, 102B, 102C, 104, 104B, returns a PIN to a subscriber identification module when inquired, locks a subscriber identification module if required, and has information on available subscriber identification modules.

The switch 10 may comprise an analog switch N:M, where N refers to possible contacts on one side of the switch 10 and M refers to possible contacts on another side of the switch 10. Maximally N components may be coupled with M components through the switch 10. The switch 10 may connect one of the N components with one of the M components. Further, the switch 10 may connect one of the N components with one of the M components and simultaneously also another of the N components with another of the M components. The switch 10 may comprise voltage shifters for contacts with different kind of components such that the voltage levels can be met.

The one or more radio modems 16, 18, 22 may be considered as a transceiver section 16, 18, 22 and each of them is capable of communicating with at least one base station 50 of a radio system wirelessly.

The wireless radio system may be any standard/non-standard/proprietary communication system that supports the use of the at least one subscriber identity module 102, 102B, 102C, 104, 104B of the at least one card 100, 100B, 100C, 100D, 100E. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

The at least one switch 10, 20 is capable of regulating, on the basis of the control data, one or more first couplings and one or more second couplings simultaneously, the one or more first couplings being formed between the one or more subscriber identification modules 102, 102B, 102C, 104, 104B and the subscriber identification module controller 14 and the one or more second couplings being formed between the one or more subscriber identification modules 102, 102B, 102C, 104, 104B and the radio modems 16, 18, 22. When the switch 10, 20 forms a coupling between a subscriber identification module 102, 102B, 102C, 104, 104B and the subscriber identification module controller 14, data can be transferred between the subscriber identification module 102, 102B, 102C, 104, 104B and the subscriber identification module controller 14. Similarly, when the switch 10, 20 forms a coupling between a subscriber identification module 102, 102B, 102C, 104, 104B and a radio modem 16, 18, 22, data can be transferred between the subscriber identification module 102, 102B, 102C, 104, 104B and the radio modem 16, 18, 22. When the switch 10, 20 decouples a coupling between a subscriber identification module 102, 102B, 102C, 104, 104B and the subscriber identification module controller 14, connection is cut and data cannot be transferred therebetween. Correspondingly, when the switch 10, 20 decouples a coupling between a subscriber identification module 102, 102B, 102C, 104, 104B and a radio modem 16, 18, 22 connection is cut and data cannot be transferred therebetween.

By being capable of having a coupling of a first subscriber identification module 102, 102B, 102C, 104, 104B to a radio modem 16, 18, 22 and a coupling of a second subscriber identification module 102, 102B, 102C, 104, 104B to the subscriber identification module controller 14 at the same time, the second subscriber identification module 102, 102B, 102C, 104, 104B may be security checked while the first subscriber identification module 102, 102B, 102C, 104, 104B takes care of the wireless communication, for example. Additionally, the data in second subscriber identification module 102, 102B, 102C, 104, 104B may be read, stored and changed during the wireless communication which uses the first subscriber identification module 102, 102B, 102C, 104, 104B without an interruption caused by switching between subscriber identification module controller 14 and the at least one radio modem 16, 18, 22. A similar solution may be used to form couplings for a plurality of subscriber identification modules in one SIM card irrespective whether the subscriber identification modules are virtual or real chips.

The control data may be used to select at least one subscriber identification module 102, 102B, 102C, 104, 104B for a security check such that each of the least one subscriber identification module 102, 102B, 102C, 104, 104B can be authenticated and accepted to be used. After passing the authentication procedure, the at least one subscriber identification module 102, 102B, 102C, 104, 104B may be used for wireless communication purposes in cooperation with one or more transceivers 16, 18, 22 simultaneously or alternatively.

In an embodiment, the at least one switch 10, 20 may form the first couplings between P subscriber identification modules 102, 102B, 102C, 104, 104B and at least one radio modem 16, 18, 22, where P is whole number larger than zero. The at least one switch 10, 20 may form the second simultaneous couplings between R subscriber identification modules 102, 102B, 102C, 104, 104B and the subscriber identification module controller 14, where P and R are cardinal numbers, R is a whole number larger than zero and the P subscriber identification modules being different from the R subscriber identification modules. The P subscriber identification modules 102, 102B, 102C, 104, 104B and the R subscriber identification modules 102, 102B, 102C, 104, 104B belong to the same subscriber identification module pool. The P and R subscriber identification modules are not the same at the same time, and thus in an embodiment, the P subscriber identification modules 102, 102B, 102C, 104, 104B have no common subscriber identification module with the R subscriber identification modules.

In an embodiment, the at least one switch 10, 20 may form the first couplings between P subscriber identification modules 102, 102B, 102C, 104, 104B and at least one radio modem 16, 18, 22, and the at least one switch 10, 20 may form the second couplings between R subscriber identification modules and the subscriber identification module controller 14 on the basis of the control data at a first moment, where P and R are whole numbers larger than zero. The switch may, on the basis of different control data at another moment, form the first couplings between Q subscriber identification module 102, 102B, 102C, 104, 104B and one or more radio modems 16, 18, 22, the one or more radio modems 16, 18, 22 being the same as or different from said at least one radio modem 16, 18, 22 of the first moment. The switch may, on the basis of different control data at another moment, form the second couplings between T subscriber identification modules 102, 102B, 102C, 104, 104B and the subscriber identification module controller 14, where P, Q, R and T are whole numbers larger than zero, the P subscriber identification modules being different from the R subscriber identification modules, the Q subscriber identification modules being different from the T subscriber identification modules, and the Q subscriber identification modules being at least partly different from the P subscriber identification modules. The R subscriber identification modules may be partly different from the T subscriber identification modules. Alternatively, the R subscriber identification modules may have no common subscriber identification module with the T subscriber identification modules. Still alternatively, the R subscriber identification modules may be the same as the T subscriber identification modules. P and R are cardinal numbers. The P, Q, R and T subscriber identification modules 102, 102B, 102C, 104, 104B belong to the same subscriber identification module pool.

In an embodiment, the at least one switch 10, 20 may couple at least one subscriber identification module 102, 102B, 102C, 104, 104B and at least one radio modem 16, 18, 22 for transferring data to the at least one radio modem 16, 18, 22 from the at least one subscriber identification module in order to enable a wireless communication between the at least one radio modem 16, 18, 22 and the at least one base station. The data transferred through the at least one switch 10, 20 may relate to at least one of the following: a user of the apparatus and the wireless communication.

The data related to the user may include PIN code(s), PUC code(s), subscriber identity and subscription information, for example. The data related to the wireless communication may refer to the operator which may directly or indirectly have effect on frequency, encoding, modulation, interleaving, encryption, ciphering etc. in the radio path, for example. Billing information which is transferred through the at least one switch 10, 20 may be considered to relate to the user, to the wireless communication or both.

In an embodiment, the at least one switch 10, 20 may switch on or off at least one coupling between a subscriber identification module 102, 102B, 102C, 104, 104B and at least one radio modem 16, 18, 22 and the subscriber identification controller 14 on the basis of the control data comprising a command and address data. The address data may determine the coupling to be switched on or switched off. The address data may refer to the unique addresses or identities of the subscriber identification module 102, 102B, 102C, 104, 104B and the at least one radio modem 16, 18, 22. In an embodiment, the address data may refer to a location such as a pocket of the equipment (see FIG. 10) at which the subscriber identification module 102, 102B, 102C, 104, 104B is placed in the equipment 400.

Figure 3A:
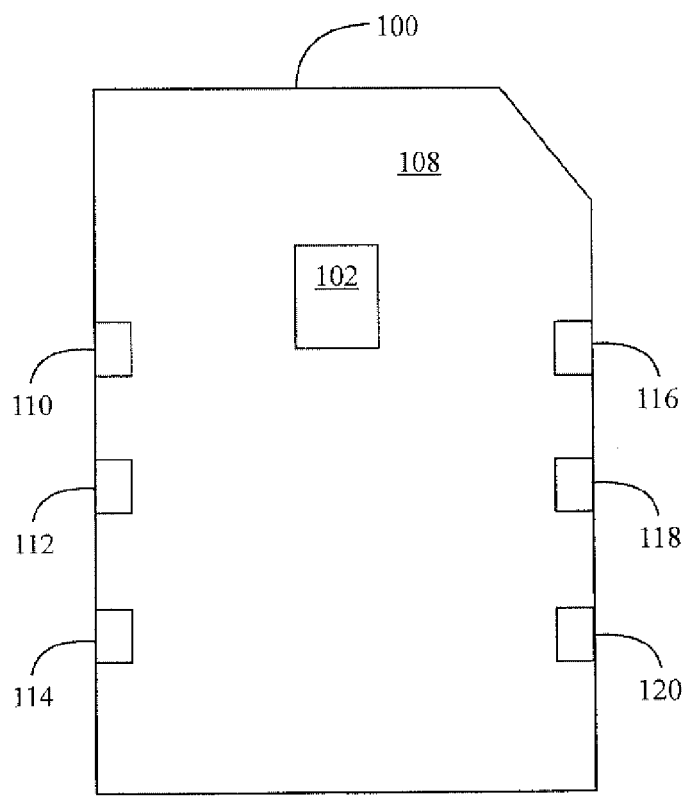
FIG. 3A illustrates a SIM card with a SIM.

FIG. 3A shows embodiments of a SIM card 100 with a subscriber identity module (SIM) chip 102. The carrier structure 108 of the SIM card 100 may be plastic such as polyvinyl chloride, polycarbonate or acrylonitrile butadiene styrene but the carrier 108 is not limited to these materials. In general, the SIM card 100 comprises an operational circuitry which comprises contact pins 110, 112, 114, 116, 118, 120, at least one memory and at least one processor for processing digital data.

In the example of FIG. 3A, the operational circuitry of the SIM card 100 comprises electrical circuits of the subscriber identity module chip 102 and conductors between the contact pins 110 to 120 and the chip 102. The subscriber module chip 102 acts as a real/concrete subscriber identity module. Other subscriber identity module cards 100B, 100C are similar to the SIM card 100.

Figure 3B:
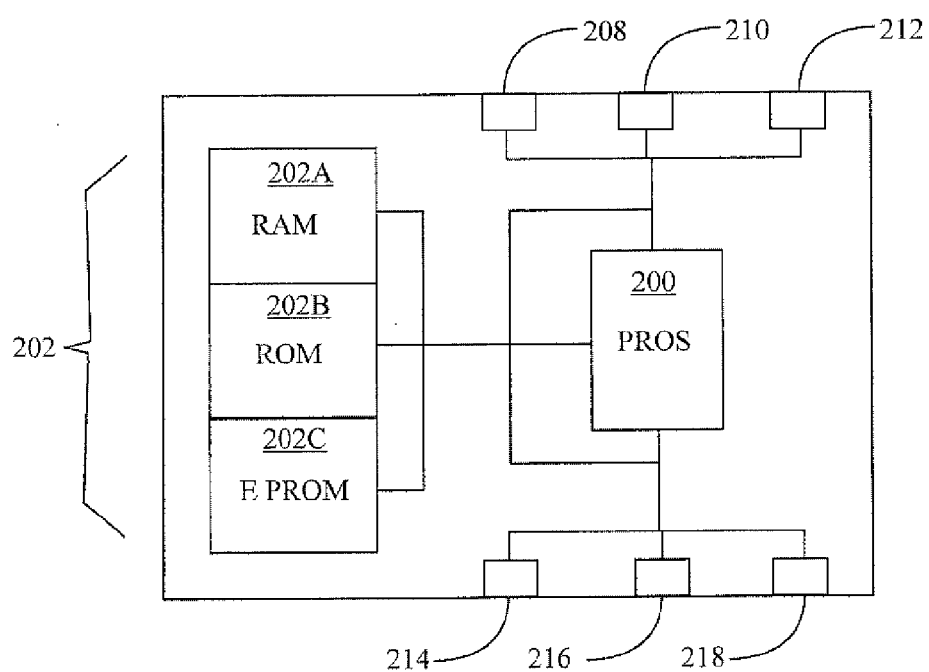
FIG. 3B illustrates a SIM.

FIG. 3B presents a structure of a subscriber identity module chip 102 (and 102B, 102C, 104, 104B shown in other Figures). The chip comprises at least one processor 200, at least one memory 202 and electrical contacts 208, 210, 212, 214, 216 and 218. A first memory 202A of the at least one memory 202 may be for storing data such as operator-specific data and/or user-specific data and it may be protected such that it is accessible only by an operator and/or by a service provider. The second memory 202B may be a working memory for a program in use at a particular moment. The third memory 202C may store the computer programs that are used by the at least one processor 200. This memory 202C may also be protected and allowed to be used only by an operator and/or by a service provider. The electric contacts 208 to 218 may connect the at least one processor 200 with the contact pins 110 to 120, and the at least one memory 202 may be coupled with the processor 200. Alternatively, the electric contacts 208 to 218 may connect the at least one memory 202 with the contact pins 110 to 120 directly.

When manufacturing the card 100, 100B, 100C, 100D, 100E, the subscriber identity module chip 102 may include all the data necessary for a proper operation in its memories. The subscriber identity module chip 102 may be arranged a in a carrier of the card 100, 100B, 100C, 100D, 100E, and electrical coupling between the contact pins 110 to 120 and the subscriber identity module chip 102 may be formed by the service provider. The service provider is not illustrated in Figures, but the service provider may be an independent supplier of one or more SIM cards 100, 100B, 100C, 100D, 100E to users.

Operators of different wireless communication systems may provide a service provider with the one or more subscriber identity module chips 102, 102B, 102C, 104, 104B which are ready to use. When a subscriber identity module chip 102, 102B, 102C, 104, 104B is ready to use it contains subscriber-identity-module-specific data. The operator refers to a mobile telephone company which offers wireless communication services to subscribers. Examples of operators may be Vodaphone, NTT DoCoMo, Elisa, AT&T, for example. In conjunction with each registration to a specific radio system of an operator, a user receives a subscriber identity module which includes information on the user and the operator. Each subscriber identity module may also include a unique serial number with which it may be addressed or identified or both addressed and identified.

In an embodiment, at least one operator of at least one wireless communication system may provide the service provider with the at least one subscriber identity module chip 102, 102B, 102C, 104, 104B with no data or with insufficient data for use. The subscriber identity module chips 102, 102B, 102C, 104, 104B may lack operator-specific data and/or user-specific data, for example. The operators may separately provide the lacking data with the service provider, and the service provider may program the data in the at least one memory 202 of the at least one subscriber identity module chip 102, 102B, 102C, 104, 104B.

The operators of different wireless communication systems may provide the service provider with the at least one subscriber identity module chip 102, 102B, 102C, 104, 104B the use of which is programmably and/or structurally blocked. The operators may separately deliver data such as a key code for removing the programmed block and/or instructions for removing the structural block. In this way, the service provider may open and/or authorize the at least one subscriber identity module chips 102, 102B, 102C, 104, 104B for use. This function may be used when a user purchases a subscriber identity module cards 100, 100B, 100C, 100D, 100E or a service provider's apparatus including at least one subscriber identity module.

The data related to the user and the wireless communication may be included in the subscriber identity module as a subscriber-identity-module-specific data of the at least one subscriber identity module 102, 102B, 102C, 104, 104B and the data may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, and other required data. The subscriber data may also include other carrier-specific data such as the short message service centre (SMSC) number, service provider name (SPN), service dialling numbers (SDN), advice-of-charge parameters, and value added service (VAS) applications. Further information may be found in the GSM Technical Specification 11.11.

The subscriber-identity-module-specific data of the at least one subscriber identity module 102, 102B, 102C, 104, 104B may also include at least one security code for each subscriber identity module irrespective of whether it is a real chip or a virtual module. A security code may comprise a personal identification number (PIN) or a PIN unlock code (PUC) which act as passwords to enable the use of a subscriber identity module if they passes a security check.

The security check may be performed in each of the subscriber identity module 100, 100B, 100C, 100D, 100E by the processor 200. The processor 200 may compare a security code which is received from outside of the subscriber identity module 100, 100B, 100C, 100D, 100E with a security code which is pre-saved in the at least one memory 202 of the subscriber identity module 100, 100B, 100C, 100D, 100E. If the two codes are found to match, the security code which is received from outside passes the security check and the subscriber identity module 100, 100B, 100C, 100D, 100E is available to use. If the two codes don't match, the security code which is received from outside doesn't pass the security check and the subscriber identity module 100, 100B, 100C, 100D, 100E isn't available to use. The security code may be stored in memories 202A, 202B or 202C. A PIN may be stored in a memory 202C which is an erasable programmable read-only-memory because in prior art the use may freely change his/her PIN. The PUC may also be stored in memory 202C. The security code may also be stored in such part of memory which cannot be changed such as memory 202B. In prior art, the security code received from outside of the subscriber identity module 100, 100B, 100C, 100D, 100E comes from a user interface which is used manually by a user. A subscriber identity module may have more than one personal identification numbers.

The number of the PINs and PUCs may be two for one subscriber identity module. A second PIN functions similarly to the first PIN. If a wrong second PIN is entered more the three times, a second PUC is requested from a user which functions in a similar manner to the first PUC.

The security code check may also be performed as follows. A security code and an algorithm may be stored in the memory 202. When security code to be checked is received by the processor 200, the processor may input the received security code in the algorithm and run the algorithm. The algorithm may output a code as a result which may then be compared with the pre-saved security code stored in the memory 202. If the output code is acceptable i.e. matches with the security code stored in the memory 202, for example, the received security code passes the security check. Otherwise, the received security code doesn't pass the security check.

Figure 4:
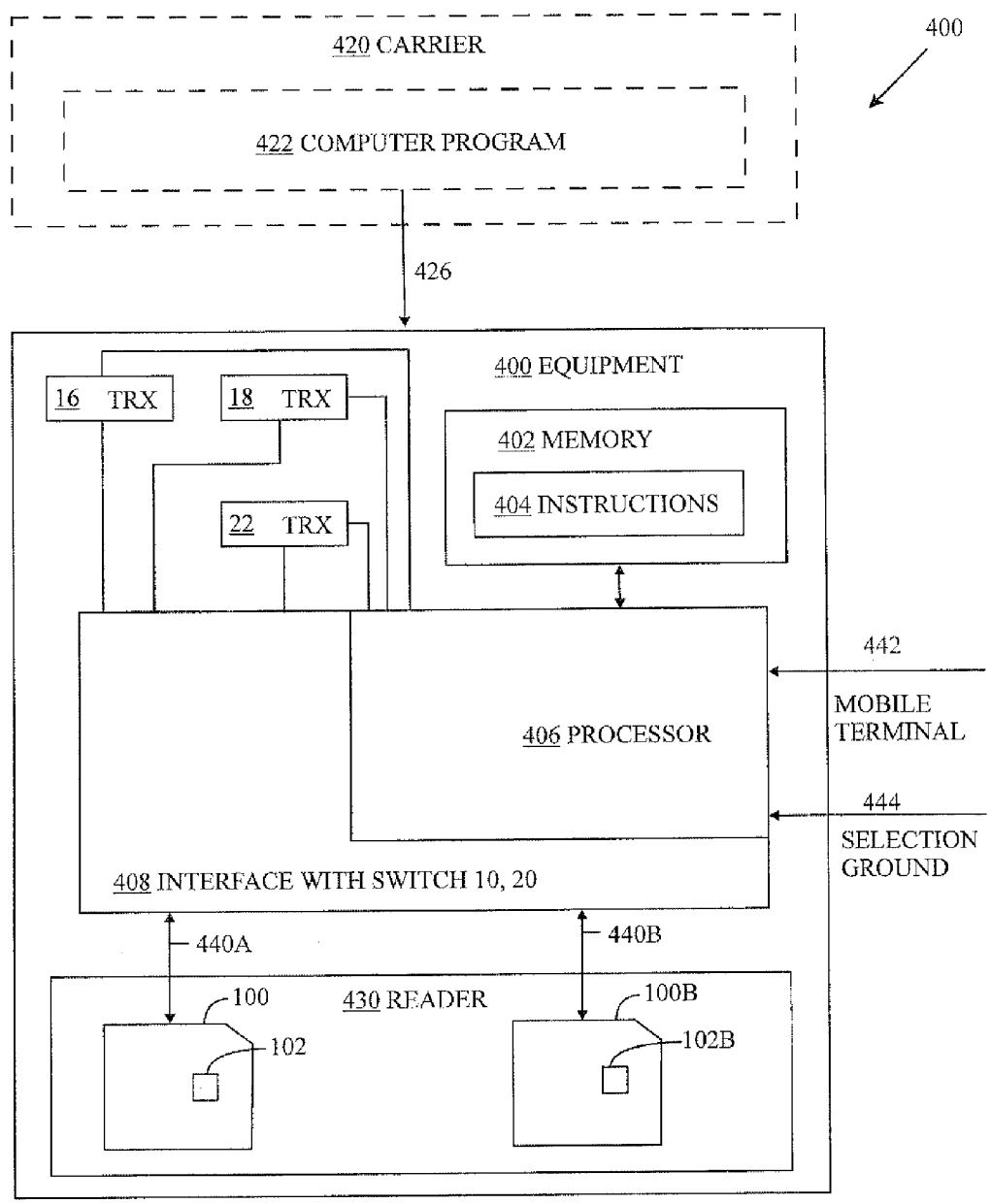
FIG. 4 illustrates equipment having at least one SIM card.

FIG. 4 presents a block diagram of general equipment 400 which may have the at least one card 100, 100B. The equipment 400 may be a mobile terminal 500 like in FIG. 5 or the equipment 400 may comprise two parts like in FIGS. 6 and 8 where at least one of the parts is the mobile terminal 500.

The equipment 400 of FIG. 4 may comprise one or more processors 406, one or more memories 402, and at least one subscriber identification module 102, 102B. Instead of comprising the at least one subscriber identification module 102, 102B, the equipment 400 may be coupled with the at least one subscriber identification module 102, 102B. A processor may be realized as an electric circuit of a digital state machine performing logic operations on the basis of instructions of a computer program.

As already explained, the at least one subscriber identification module 102, 102B may be included in at least one card 100, 100B. The at least one subscriber identification module 102, 102B are capable of storing one or more security codes which are used in a security code check for controlling usability of the at least one subscriber identification module 102, 102B.

The equipment 400 may comprise an interface 408 for exchanging data between the at least one subscriber identity module 102, 102B, 102C, 104, 104B associated with the at least one card 100, 100B and the at least one processor 406. Each of the at least one subscriber identity module 102, 102B may be real i.e. a chip or virtual i.e. emulated by an emulating integrated circuit. The at least one subscriber identity module 102, 102B, when the cards 100, 100B are coupled with the equipment 400, may be operationally active parts simultaneously or successively. The interface 108 may include a (contact) smart card reader 430 capable of reading the subscriber data through a coupling between the at least one card 100, 100B and the smart card reader 430.

The structure of the equipment 400 is now explained with the help of FIGS. 1 and 4. The equipment 400 comprises at least one switch 10, 20 included in the interface 408, for example. The equipment 400 comprises a general controller 12 included in the processor 406 and the memory 402, for example. The processor 406 may comprise the processor 60 in FIG. 2. The memory 402 may comprise the memory 62 in FIG. 2. The equipment 400 comprises one or more subscriber identification modules 102, 102B, 102C, 104, 104B and a subscriber identification module controller 14 included in the processor 406 and memory 402 which may comprise the processor 60 and the memory 62, respectively. The equipment 400 further comprises one or more radio modems 16, 18, 22.

Each of the at least switch 10, 20 is operably coupled with the general controller 12, one or more subscriber identification modules 102, 102B, 102C, 104, 104B, the subscriber identification module controller 14, and one or more radio modems 16, 18, 22 each of which is configured to wirelessly communicate with at least one base station of a radio system. Different switches 10, 20 may be coupled with different subscriber identification modules and different radio modems. The subscriber identification module controller 14 may comprise different subscriber identification module controller units for different subscriber identification modules or different groups of subscriber identification modules.

Each of the at least switch 10, 20 may receive control data from the general controller 12. Each of the at least switch 10, 20 is then capable of regulating, on the basis of the control data, one or more first couplings and one or more second couplings simultaneously, the one or more first couplings being formed between one or more subscriber identification modules 102, 102B, 102C, 104, 104B and the subscriber identification module controller 14 and the one or more second couplings being formed between one or more subscriber identification modules 102, 102B, 102C, 104, 104B and the radio modems 16, 18, 22.

In an embodiment, each of the at least switch 10, 20 may form a coupling between at least one subscriber identification module 102, 102B, 102C, 104, 104B and the at least one radio modem 16, 18, 22.

Then the at least one subscriber identification module 102, 102B, 102C, 104, 104B and the at least one radio modem 16, 18, 22 may transfer data to the at least one radio modem 16, 18, 22 from the at least one subscriber identification module 102, 102B, 102C, 104, 104B, and the at least one radio modem 16, 18, 22 may perform a wireless communication with at least one base station on the basis of the data transferred through the switch 10, 20, the transferred data relating to at least one of the following: a user of the apparatus and the wireless communication.

The general controller 16 comprises one or more processors 60 and one or more memories 62. The one or more memories 62 may store instructions, that, when executed by the one or more processors 60, may cause the general controller 16 to feed the control data to the at least one switch 10, 20 for regulating, one or more first couplings and one or more second couplings simultaneously, the one or more first couplings being formed between the one or more subscriber identification modules 102, 102B, 102C, 104, 104B and the subscriber identification module controller 14 and the one or more second couplings being formed between the one or more subscriber identification modules 102, 102B, 102C, 104, 104B and the radio modems 16, 18, 22.

In an embodiment, the one or more memories 62 may store instructions, that, when executed by the one or more processors 60, may cause the general controller 16 to: obtain data of the at least one subscriber identity module 102, 102B, 102C, 104, 104B for controlling the use of said at least one subscriber identity module 102, 102B, 102C, 104, 104B for wireless communication. The instructions, when executed by the one or more processors 60, may cause the general controller 16 to: form the control data on the basis of the data from the at least one subscriber identity module. The instructions, when executed by the one or more processors, may cause the general controller 16 to feed the control data to the at least one switch 10, 20 for regulating, on the basis of the control data, one or more first couplings and one or more second couplings simultaneously, the one or more first couplings being formed between one or more subscriber identification modules 102, 102B, 102C, 104, 104B and the subscriber identification module controller 14 and the one or more second couplings being formed between one or more subscriber identification modules 102, 102B, 102C, 104, 104B and the radio modems 16, 18, 22. When a subscriber identification module card 100, 100B, 100C, 100D, 100E is inserted in the equipment, the subscriber identification module controller 14 reads data of the subscriber identification module and informs the general controller 16 about it. Hence, while a subscriber identification module is read another may be used in the wireless communication.

In an embodiment, the control data may define the at least coupling by the data from the at least one subscriber identity module 102, 102B, 102C, 104, 104B which includes the subscriber-identity-module-specific data for uniquely identifying each of the one or more subscriber identity modules 102, 102B, 102C, 104, 104B available and addressing each subscriber identity module 102, 102B, 102C, 104, 104B separately. The control data may also define a radio-modem-specific data which is included in the control data and which is configured to uniquely identify each of the one or more radio modems.

In an embodiment, the one or more memories 62 of the general controller 12 may store instructions, that, when executed by the one or more processors 60, may cause the general controller 12 to the obtain selection ground data associated with the subscriber identity modules 102, 102B, 102C, 104, 104B. The instructions, when executed by the one or more processors, may cause the general controller 12 to select at least one optimal subscriber identity module 102, 102B, 102C, 104, 104B for use by the mobile terminal on the basis of the data of the subscriber identity modules and the selection ground data for the subscriber identity modules. The instructions, when executed by the one or more processors 60, may cause the general controller 12 to form the control data for the selected at least one subscriber identity module 102, 102B, 102C, 104, 104B. The instructions, when executed by the one or more processors 60, may cause the general controller 12 to feed the control data to the at least one switch 10, 20 for regulating, on the basis of the control data, a simultaneous coupling of the at least one subscriber identification module of all subscriber identification modules 102, 102B, 102C, 104, 104B with both the subscriber identification module controller 14 and the at least one radio modem of all radio modems 16, 18, 22.

Examine now authentication of a SIM. The equipment 400 comprising one or more memories 402 may store instructions 404 of a computer program which, in an embodiment, may store instructions, that, when executed by the one or more processors 406, may cause the equipment 400 to obtain a request, which is associated with the security code check, from the at least one subscriber identification module 102, 102B, 102C, 104, 104B for at least one security code. The one or more memories 402 store instructions, that, when executed by the one or more processors 406, may cause the equipment 400 to control providing an automatic response to the request with at least one security code available to the equipment for enabling or disabling the use of the at least one subscriber identification module 102, 102B, 102C, 104, 104B. A security code of a subscriber identification module 102, 102B, 102C, 104, 104B which is requested may be a PIN or a PUC, for example.

In an embodiment, the one or more memories 402 may store at least one security code for at least one subscriber identification module pre-saved therein by a service provider of the equipment 400. Then, the instructions stored in the one or more memories 402, when executed by the one or more processors 406, may cause the equipment 400 to provide an automatic response to the request with the at least one security code stored in the one or more memories 402. When the at least one security code stored in the one or more memories 402 is correct, which is the usual case when the user has not informed the service provider that the equipment 400 has been stolen, for instance, the at least one security code enables the use of the at least one subscriber identification module 102, 102B, 102C, 104, 104B, since each correct security code passes the security check. Often a PIN of a subscriber identity module may automatically be fed for the security check. However, a PUC may also be fed for the security check in this manner if it is required.

In an embodiment, the equipment 400 comprises or is operably coupled with a wireless transceiver 16, 18, 22 (see FIGS. 5, 6 and 7) which operates on radio frequency signals of a radio system. The instructions stored in the one or more memories 402, when executed by the one or more processors 406, may cause the equipment 400 to wirelessly request for the at least one security code from a server 708 of a service provider, and wirelessly obtain a response from the server 708. Then, the instructions stored in the one or more memories 402, when executed by the one or more processors 406, may cause the equipment 400 to provide an automatic response to the request with at least one security code included in the response received from the server 708. This enables the use of the at least one subscriber identification module 102, 102B, 102C, 104, 104B if the at least one provided security code passes the security check. This operation may be used when the equipment is switched on and the available subscriber identity modules for the equipment have been identified. This operation may also be used after the equipment is switched on and one or more new subscriber identity modules have been set in the equipment. When the one or more new subscriber identity modules identify themselves and request for security codes, the response may be performed accordingly.

In an embodiment, the instructions stored in the one or more memories 402, when executed by the one or more processors 406, may cause the equipment 400 to store each security code obtained from the server 708 in the one or more memories 402. The instructions stored in the one or more memories 402, when executed by the one or more processors 406, may cause the equipment 400 to store each security code obtained from the server 708 in the at least one subscriber identification module 102, 102B, 102C, 104, 104B. The one or more security codes may be stored in the at least one subscriber identification module 102, 102B, 102C, 104, 104B on the basis of the request.

A request from a subscriber identification module can be distinguished from requests from other subscriber identification modules by the unique serial number of each subscriber identification module. Similarly, a security code may be fed to a correct subscriber identification module on the basis of the unique serial number of each subscriber identification module which may have been included in the request. Hence, the instructions stored in the one or more memories 402, when executed by the one or more processors 406, may cause the equipment 400 to receive a unique serial number with the request from each subscriber identification module. Further, the instructions stored in the one or more memories 402, when executed by the one or more processors 406, may cause the equipment 400 to control providing an automatic response to each of the at least one subscriber identity module on the basis of the unique serial number. Hence, each automatic response may be addressed on the basis of the at least one unique serial number such that each part of the automatic response is directed a desired subscriber identity module.

In an embodiment, the instructions stored in the one or more memories 402, when executed by the one or more processors 406, may cause the equipment 400 to obtain, through the wireless transceiver 16, 18, 22, at least one new security code of the at least one subscriber identification module 102, 102B, 102C, 104, 104B transmitted by the service provider. And the instructions stored in the one or more memories 402, when executed by the one or more processors 406, may cause the equipment 400 to change the at least one security code by storing at least one new security code in the one or more memories 402. Moreover, the instructions stored in the one or more memories 402, when executed by the one or more processors 406, may cause the equipment 400 to change the at least one security code by storing at least one new security code in the at least one subscriber identification module 102, 102B, 102C, 104, 104B. Here also the at least one security code of at least one anchor subscriber identification module 102C to 106C may be changed.

The equipment 400 may comprise or may be operably coupled with a wireless receiver 16, 18, 22 (see FIGS. 5 to 7) which may operate on radio frequency signals of a radio system. The instructions stored in the one or more memories 402, when executed by the one or more processors 406, may cause the equipment 400 to obtain, through the wireless receiver 16, 18, 22, a service provider's lock command associated with at least one subscriber identification module 102, 102B, 102C, 104, 104B. And as a response to the obtained lock command, the instructions stored in the one or more memories 402, when executed by the one or more processors 406, may cause the equipment 400 to: prevent providing with one or more security codes stored in the one or more memories 402 prior to the lock command for limiting the use of the at least one subscriber identification module 102, 102B, 102C, 104, 104B associated with the lock command. Hence, the equipment 400 may automatically stop providing the at least one security code to the at least one subscriber identity module which has been identified in the lock command. The identification of the at least one subscriber identity module may be performed by the at least one unique serial number.

In an embodiment, the equipment 400 may comprise or may be operably coupled with a user interface 616 (see FIG. 5 to 7), and the instructions stored in the one or more memories 402, when executed by the one or more processors 406, may cause, as a response to the obtained lock command, the equipment 400 to require at least one personal identification number unlock code of at least one subscriber identification module 102, 102B, 102C, 104, 104B associated with the lock command through the user interface 616.

In an embodiment, the lock command may comprise at least one incorrect security code of at least one subscriber identification module 102, 102B, 102C, 104, 104B for causing a failure in the security code check.

In an embodiment, after the lock command and after the service provider has identified the user, the instructions stored in the one or more memories 402, when executed by the one or more processors 406, may cause the equipment 400 to: obtain, through the wireless receiver 16, 18, 22, an unlock command. And the instructions stored in the one or more memories 402, when executed by the one or more processors 406, may cause the equipment 400 to allow providing a response with at least one security code available to the equipment 400 as a response to the unlock command. The use of the at least one subscriber identification module 102, 102B, 102C, 104, 104B may then be enabled if the at least one provided security code passes the security check.

In an embodiment, the one or more memories 402 may store also instructions, that, when executed by the one or more processors, may cause the equipment 400 to obtain data 440A, 4406 from the at least one subscriber identity module 102, 102B, 102C, 104, 104B for controlling the use of at least one subscriber identity module 102, 102B, 102C, 104, 104B for wireless communication on the basis of the data 440A, 440B. The data 440A, 440B may include the subscriber-identity-module-specific data, for example. The data uniquely identifies each of the one or more subscriber identity modules which are available, and the data may be used to address each subscriber identity module separately.

In an embodiment with a plurality of subscriber identity modules 102, 102B, 102C, 104, 104B, the instructions 404, when executed by the one or more processors 406, may cause the equipment 400 to obtain data 440A, 440B of the subscriber identity modules 102, 102B, 102C, 104, 104B, obtain selection ground data 444 associated with the subscriber identity modules 102, 102B, 102C, 104, 104B, and select at least one optimal subscriber identity module 102, 102B, 102C, 104, 104B for use by the mobile terminal on the basis of the data 440A, 440B of the subscriber identity modules, and the selection ground data 444 for the subscriber identity modules 102, 102B, 102C, 104, 104B. The data 442 relating to a mobile terminal may also be obtained and it may have effect on the selection.

With this kind of processing, utilization of a wide range of subscriber identity modules becomes possible, and, furthermore, selection of the right subscriber identity module becomes user friendly and automatic (or at least semi-automatic if user interaction is required for the selection or its confirmation). Additionally, the at least one subscriber identity module 102, 102B, 102C, 104, 104B may easily be carried with because the at least one subscriber identity module may be in one card similar to a SIM of prior art.

Depending on the processing power needed, the equipment 400 may comprise several processors 406 such as parallel processors or a multicore processor. When designing the implementation of the processor 406, a person skilled in the art will consider the requirements set for the size and power consumption of the equipment 400 of FIG. 4, the necessary processing capacity, production costs, and production volumes, for example. The processor 406 and the memory 402 may be implemented by an electronic circuitry. In an example embodiment, the processor 406 is Freescale™ i.MX233 applications processor such as MCIMX233CJM4C and the memory 402 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 406 and the memory 402 includes, but is not limited to:
  logic components,
  standard integrated circuits,
  application-specific integrated circuits (ASIC),
  system-on-a-chip (SoC),
  application-specific standard products (ASSP),
  microprocessors,
  digital signal processors,
  special-purpose computer chips, and
  field-programmable gate arrays (FPGA).

Similar techniques may be applied in conjunction with the at least one subscriber identity module chip processor 200, memories 202 and the at least one emulating integrated circuit 300. The instructions 404 may be implemented by software and/or hardware. In an example embodiment, the software may be written by a suitable programming language (such as C, C++, or Java), and the resulting executable instructions 404 may be stored in the memory 402 and run by the processor 406.

In an embodiment, the one or more memories 402 may further store instructions 404, that, when executed by the one or more processors 406, may cause the equipment 400 to obtain the data of the at least one subscriber identity module 102, 102B, 102C, 104, 104B by at least one of the following: read the data 440A, 440B from the at least one subscriber identity module 102, 102B, 102C, 104, 104B, receive the data 440A, 440B wirelessly from a service provider, receive the data 440A, 440B from a user interface manipulated by a user of a mobile terminal.

Various criteria may be used alone or in combination for selecting at least one subscriber identity module 102, 102B, 102C, 104, 104B of the cards 100, 100B, 100C, 100D, 100E. A simple selection ground 444 of the at least one subscriber identity module 102, 102B, 102C, 104, 104B could be formulated as follows: "use the cheapest subscriber identity module of the at least one card 100, 100B, 100C, 100D, 100E that provides the required service at the required quality of service in the present location of the mobile terminal by network operator A if available, and if operator A is not available then by any other operator fulfilling the criteria", but this is only an example embodiment, as the selection ground 444 may be much simpler or much more complex.

The one or more memories 402 may store instructions 404, that, when executed by the one or more processors 406, may cause the equipment 400 to: obtain data 440A, 440B from the at least one subscriber identity module 102, 102B, 102C, 104, 104B and control the use of at least one subscriber identity module 102, 102B, 102C, 104, 104B of at least one operator of wireless communication associated with the at least one card 100, 100B, 100C, 100D, 100E for wireless communication.

In an embodiment comprising a plurality of subscriber identity modules 102, 102B, 102C, 104, 104B, the one or more memories 402 may further store instructions 404, that, when executed by the one or more processors 406, may cause the equipment 400 to use at least one (for example SIM 102) of the subscriber identity modules 102, 102B, 102C, 104, 104B as the default subscriber identity module. The instructions 404 may also use the at least one default subscriber identity module (SIM 102 according to the example) after start-up of the mobile terminal. The at least one default subscriber identity module (i.e. SIM 102 according to the example) may, besides being the at least one starting subscriber identity module, be also the at least one controlling subscriber identity module, and possibly also the at least one back-up subscriber identity module. The mobile terminal may use the at least one default SIM (i.e. SIM 102 according to the example) for communication.

In an example embodiment, the equipment 400 may be a mobile wireless communication terminal, a mobile an accessory of a mobile wireless communication terminal, a combination of a mobile wireless communication terminal and an accessory of the mobile wireless communication terminal, an accessory of a mobile terminal, a combination of a mobile terminal and an accessory of the mobile terminal, or a USB (Universal Serial Bus) modem, or any other suitable mobile terminal capable of employing the at least one subscriber identity module 102, 102B, 102C, 104, 104B, such as a mobile phone, a tablet pc, a portable computer, or a computer.

Figure 5:
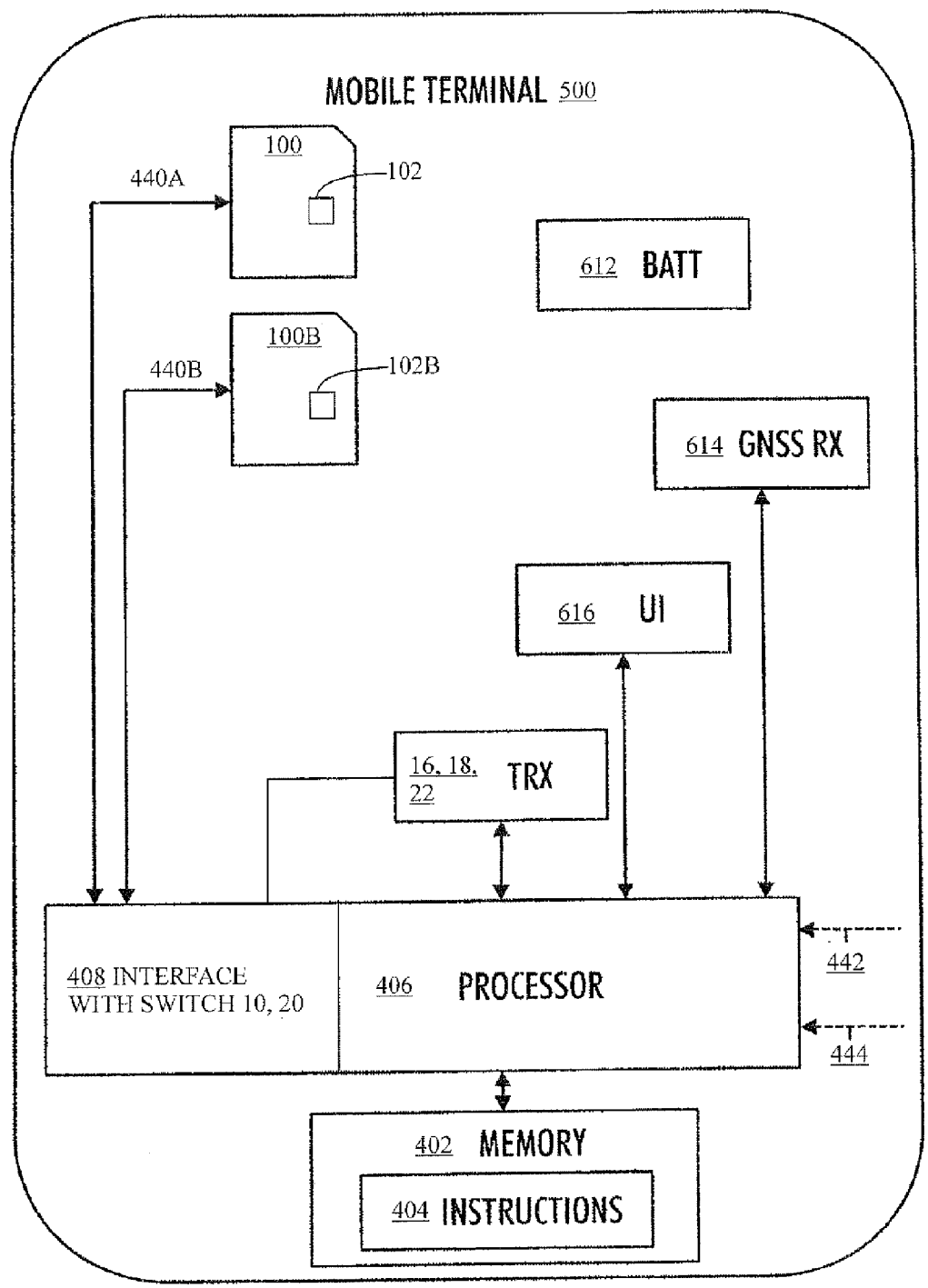
FIG. 5 illustrates a mobile terminal with at least one SIM card.

FIG. 5 illustrates an example embodiment wherein the functionality of the equipment 400 of FIG. 4 is also implemented to the mobile terminal 500. Consequently, the equipment 400 comprises the interface 408 associated with the at least one subscriber identity module 102, 102B, 102C, 104, 104B of the at least one card 100, 100B, 100C, 100D, 100E, the one or more processors 406, and the one or more memories 402 storing the instructions 404. The mobile terminal 400 may also comprise at least some of other parts 612, 614, 616, 16, 18, 22 as shown in FIG. 5, but explained in relation to FIG. 6.

The mobile terminal 500 comprises at least one switch 10, 20 included in the interface 408, for example. As already explained with respect to FIG. 4, the mobile terminal 500 comprises a general controller 12 which may be included in the processor 406 and the memory 402, for example. The mobile terminal 500 comprises one or more subscriber identification modules 102, 102B, 102C and a subscriber identification module controller 14 which may be included in the processor 406. The mobile terminal 500 comprises the memory 402 and one or more radio modems 16, 18, 22.

Each of the at least switch 10, 20 may receive control data from the general controller 12. Each of the at least switch 10, 20 is then capable of regulating, on the basis of the control data, one or more first couplings and one or more second couplings simultaneously, the one or more first couplings being formed between one or more subscriber identification modules 102, 102B, 102C, 104, 104B and the subscriber identification module controller 14 and the one or more second couplings being formed between one or more subscriber identification modules 102, 102B, 102C and the radio modems 16, 18, 22.

Figure 6:
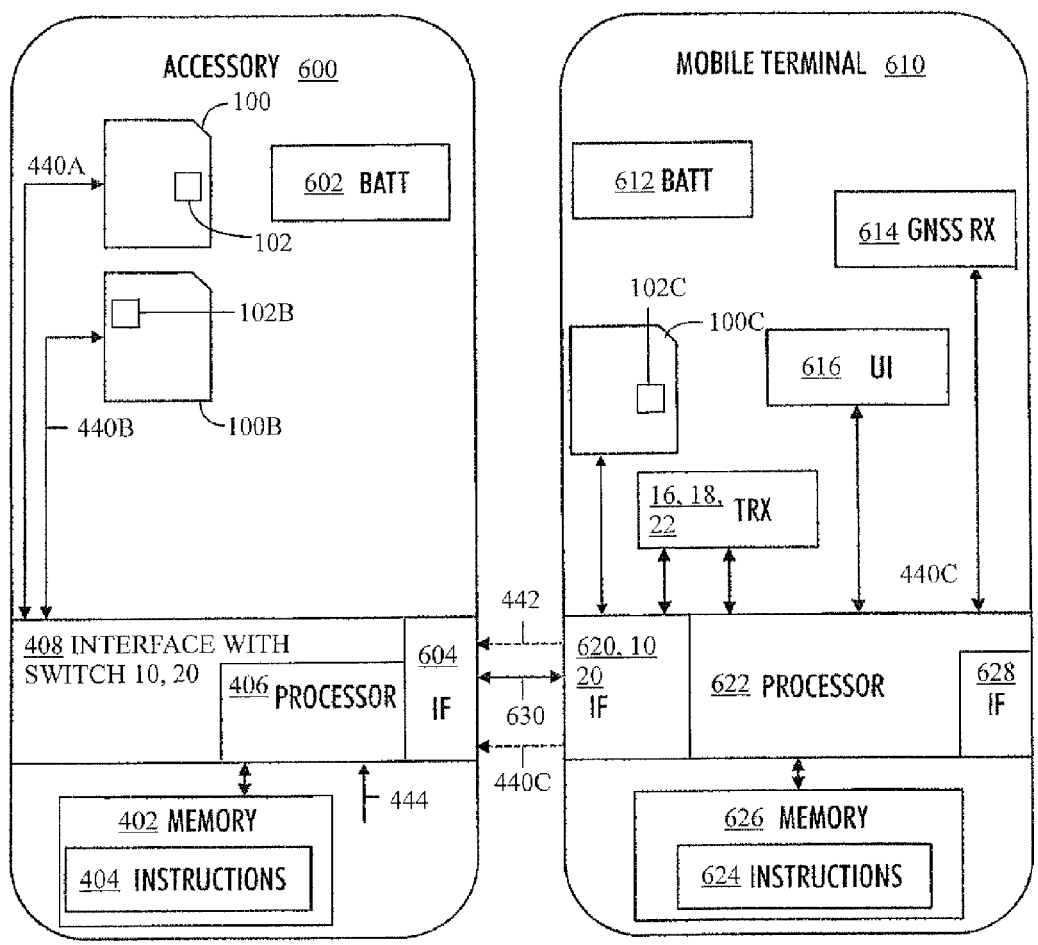
FIG. 6 illustrates an accessory of a mobile terminal having at least one SIM card.

FIG. 6 illustrates an example embodiment wherein the equipment 400 of FIG. 4 functionality is implemented in an accessory 600 of a mobile terminal 610. Consequently, the accessory 600 comprises the at least one the subscriber identity module 102, 102B, 102C of the at least one card 100, 100B, 100C. The accessory 600 may also comprise the at least one processor 406 and at least one memory 402 with the instructions 404. The at least one subscriber identity module 102, 102B, 102C may comprise an anchor subscriber identity module 102C. In general, there may be more than one anchor subscriber identity modules. The at least one anchor subscriber identity module 102C may be the one which is used when the equipment 400 is switched on. If a different operator is wished for, for example, the subscriber identity module to be used may be changed. The card 100C, like one or more other cards 102, 102B, may be taken out from the mobile terminal 610 and inserted in the accessory 600.

The accessory 600 may or may not comprise a battery 602, depending on the power requirements of the accessory 600 and the possibility to obtain electric energy from an external source such as the mobile terminal 610. The (rechargeable) electrical battery 602 is one or more electrochemical cells that convert stored chemical energy into electrical energy. Instead of battery 602, other suitable means may be used to store and/or provide energy.

The interface 408 associated with the at least one subscriber identity module 102, 102B, 102C, 104, 104B may be within the accessory 600, but also another interface 620 associated with the subscriber identity module 102C to 106C possibly located in the mobile terminal 610 may be needed.

Furthermore, both the mobile terminal 610 and the accessory 600 comprise a wired or wireless communication protocol interface 604, 620 which may be standard or proprietary. The communication protocol interface 604, 620 enables two-way communication 630 between the mobile terminal 610 and the accessory 600. In an example embodiment, the interface 604, 620 may be implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I²C (Inter-Integrated Circuit) or SPI (System Packet Interface). The data 440A, 440B, 440C of the at least one subscriber identity module 102, 102B, 102C of the cards 100, 100B, 100C and the data 442 relating to the mobile terminal 610 may be transferred from the mobile terminal 610 to the accessory 600 through the interfaces 604, 620 and potentially through the at least one processor 622.

In an embodiment, the accessory 600 may comprise at least one switch 10, 20 included in the interface 408, for example. As already explained with respect to FIGS. 4 and 5, the accessory 600 may comprise a general controller 12 which may be included in the processor 406 and the memory 402, for example. The accessory 600 may comprise one or more subscriber identification modules 102, 102B, 102C and a subscriber identification module controller 14 which may be included in the processor 406 and memory 402. The accessory 600 may not comprise a radio modem. However, the mobile terminal 610 may comprise one or more radio modems 16, 18, 22. The switches 10, 20 in the interface 408 may be coupled with an interface 604 of the accessory 600. The interface 604 has on operational coupling with an interface 620 of the mobile terminal 610. Thus, because of interfaces 604 and 620 the information between the subscriber identity mobiles 102, 102B, 102C and the one or more radio modems 16, 18, 22 may be transferred in a similar manner to what is explained earlier. The one or more radio modems 16, 18, 22 may have a direct contact with the interface 620 of the mobile terminal 610 or through the at least one processor 622 of the mobile terminal 610. The interface 628 may be used to for a coupling with an auxiliary device.

Each of the at least switch 10, 20 may receive control data from the general controller 12. Each of the at least switch 10, 20 may then be capable of regulating, on the basis of the control data, one or more first couplings and one or more second couplings simultaneously, the one or more first couplings being formed between one or more subscriber identification modules 102, 102B, 102C and the subscriber identification module controller 14 and the one or more second couplings being formed between one or more subscriber identification modules 102, 102B, 102C and the radio modems 16, 18, 22.

In an embodiment of FIG. 6, the interface 620 of the mobile terminal 610 comprises at least one switch 10, 20 in the way of the mobile terminal 500 shown in FIG. 5. The mobile terminal 610 may comprise a general controller 12 which may be included in the processor 622 and the memory 626, for example. The mobile terminal 610 may comprise one or more subscriber identification modules 102, 102B, 102C, and the mobile terminal 610 may be connectable with the accessory 600 through the interface 620. The accessory 600 may include subscriber identification modules 102, 102B, 102C and the interface 408 with at least one switch 10, 20. The mobile terminal 610 may comprise a subscriber identification module controller 14 which may be included in the processor 622 and the memory 626. The mobile terminal 610 may comprise one or more radio modems 16, 18, 22. Because of interfaces 604 and 620 the information between the subscriber identity mobiles 102, 102B, 102C and the radio modems 16, 18, 22 may be transferred in a similar manner to what is explained earlier.

Each of the at least switch 10, 20 may receive control data from the general controller 12. Each of the at least switch 10, 20 is then capable of regulating, on the basis of the control data, one or more first couplings and one or more second couplings simultaneously, the one or more first couplings being formed between one or more subscriber identification modules 102, 102B, 102C and the subscriber identification module controller 14 and the one or more second couplings being formed between one or more subscriber identification modules 102, 102B, 102C and the radio modems 16, 18, 22.

In an embodiment, the at least one processor 406 and the memory 402 of the accessory 600 may comprise the subscriber identification module controller 14 although the at least one processor 622 and the memory 626 of the mobile terminal 610 comprises the general controller 12.

Examine now the data transfer from the SIM(s) 102, 102B, 102C. The instructions 404, when executed by the one or more processors 406 of the accessory 600, may cause the accessory 600 to: obtain data 440A, 440B from the at least one subscriber identity module 102, 102B, 102C and control the use of at least one subscriber identity module of at least one subscriber identity module 102, 102B, 102C of at least one operator of wireless communication associated with the at least one card 100, 100B, 100C, for wireless communication.

In an embodiment comprising a plurality of subscriber identity modules 102, 102B, 102C, the instructions 404, when executed by the one or more processors 406 of the accessory 600, may cause the accessory 600 to obtain the data 440A, 440B, 440C of the subscriber identity modules 102, 102B, 102C, obtain selection ground data 444 for the at least one subscriber identity module, and select at least one optimal subscriber identity module 102, 102B, 102C of cards 100, 100B, 100C for use by the mobile terminal 610 on the basis of the data 440A, 440B, 440C of the subscriber identity modules, and the selection ground 444 for the subscriber identity module. The data 442 relating to a mobile terminal 610 may also be obtained and it may have effect on the selection. The data 440A, 440B, 440C may include the subscriber-identity-module-specific data such as ICCID, IMSI or their combination, for instance. The data uniquely identifies each of the one or more subscriber identity modules which are available, and the data may be used to address each subscriber identity module separately.

In an example embodiment, the mobile terminal 610 may be a mobile wireless communications terminal employing a transceiver 16, 18, 22 capable of communicating with a wireless communication system. In an example embodiment, the mobile terminal 610 may be a mobile phone comprising the card 100C comprising a default subscriber identity module 102C, a user interface 616, a battery 612, at least one processor 622 and at least one memory 626 with instructions 624.

The user interface 616 may comprise a display, means for producing sound, a mechanical input means or the like. The display may be a liquid crystal display, an active-matrix of light-emitting diodes or the like, and it may be a touch screen. The means for producing sound may be a loudspeaker or a simpler means for producing beeps or other sound signals. The mechanical input means may comprise a QWERTY keyboard, a keypad and/or a few movable buttons. A parameter, setting or command relating to the described processing of the at least one subscriber identity module 102, 102B, 102C may be manipulated with the user interface 616. However, the equipment 400 doesn't accept a PIN from the user interface 616 or the equipment 400 may prevent the use of the user interface 616 for inputting the PIN, since the equipment 400 controls the response to a request to input the PIN. As already explained, the equipment 400 automatically inputs the PIN if its input has not been forbidden by a wireless command coming from the service provider. The equipment 400 may also prevent the use of the user interface 616 for inputting the PUC, since the equipment 400 may also control the response to a request to input the PUC. The equipment 400 may automatically input the PIN if its input has not been forbidden by a wireless command coming from the service provider. Hence in an embodiment, the instructions stored in the one or more memories 402, when executed by the one or more processors 406, may cause the equipment 400 to prevent acceptance of the one or more security codes from the user interface 616 during a request for the one or more security codes.

Furthermore, the mobile terminal 610 may comprise a positioning receiver 614 receiving external location information, which may be utilized to generate location of the mobile terminal 610. The positioning receiver 614 may be a receiver of the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. Besides global navigation satellites, the positioning receiver 614 may also determine its location by utilizing other known positioning techniques. It is well known that by receiving radio signals from several different base stations, a mobile phone may determine its location, for example. The position data may be used as a selection ground data.

In the example embodiment of FIG. 6, the accessory 600 may not comprise a user interface of its own, but the user interaction is performed through the user interface 616 of the mobile terminal 610 as data may be transferred between the accessory 600 and the mobile terminal 610 through the interfaces 604, 620. However, in another example embodiment, the accessory 600 may comprise a user interface as well for outputting and/or inputting data of the described processing of the at least one subscriber identity module 102, 102B, 102C of the at least one subscriber identity module card 100, 100B, 100C. The user input may be used as a selection ground data.

In the example embodiment of FIG. 6, the equipment 400 of FIG. 4 functionality may be implemented in the accessory 600 such that the instructions 404 are run in the at least one processor 406 of the accessory 600. However, also such an example embodiment is feasible wherein a part of the equipment 400 of FIG. 4 functionality is implemented in the mobile terminal 610 as well such that a part of the instructions 404 are also run in the at least one processor 622 of the mobile terminal 610.

Figure 7A:
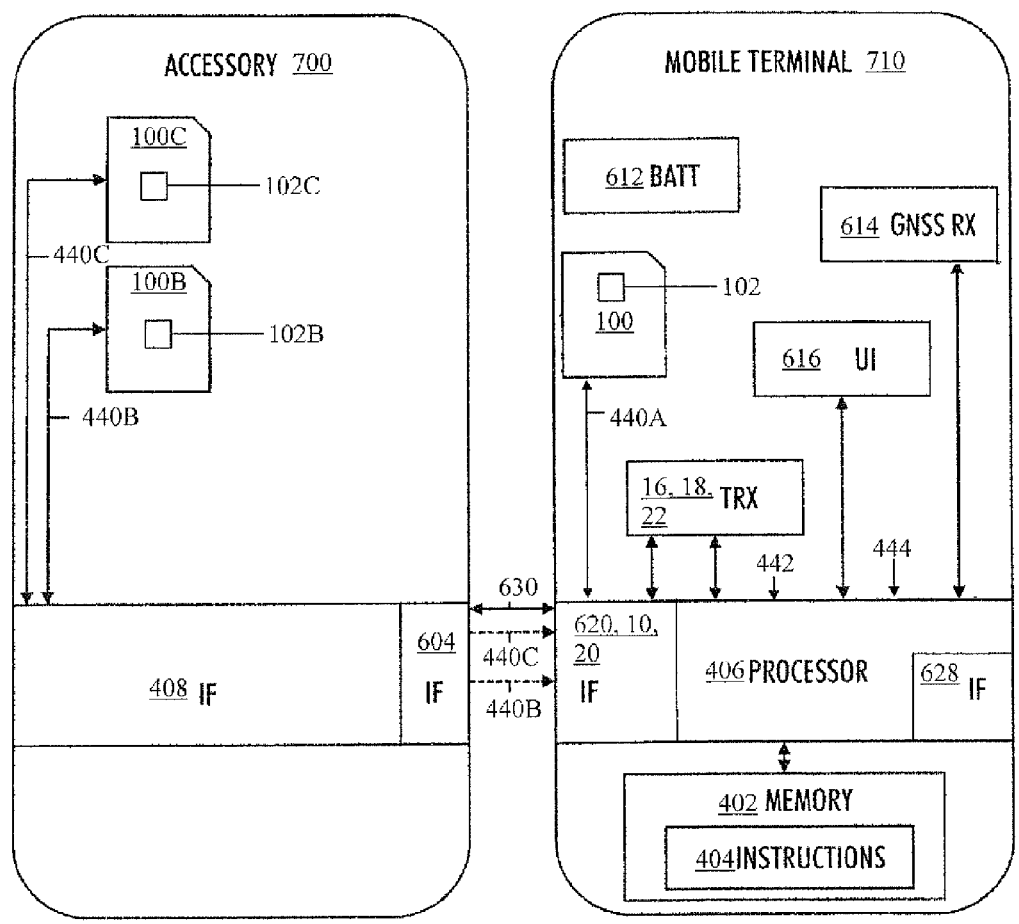
FIG. 7A illustrates at least one SIM card in an accessory for a mobile terminal and/or in a mobile terminal.

FIG. 7A illustrates an example embodiment wherein the equipment 400 of FIG. 4 functionality is divided between an accessory 700 of a mobile terminal 710 and the mobile terminal 710. Consequently, the accessory 700 comprises the plurality of the subscriber identity modules 102, 102B, 102C of the cards 100, 100B, 100C. The interface 408 associated with the subscriber identity modules 102B, 102C is within the accessory 700, but also another interface 620 associated with the subscriber identity module 102 possibly located in the mobile terminal 710 may be needed. But, as shown in FIG. 7, the accessory 700 may not require a processor or a memory.

The mobile terminal 710 comprises the at least one processor 406 and at least one memory 402 with the instructions 404, and also the other parts 16, 18, 22, 612, 614, 616, 620 as shown in FIG. 7A, and explained in relation to FIG. 6.

In the example embodiment of FIG. 7A, the accessory 700 is a kind of container including the cards 100B, 100C of extra subscriber identity modules 102B, 102C to be used by the mobile terminal 710, but the required processing is performed only in the at least one processor 106 of the mobile terminal 710.

The data 440B, 440C of the subscriber identity modules 102B, 102C may be transferred from the accessory 700 to the mobile terminal 710 through the interfaces 604, 620.

In an embodiment of FIG. 7A, the interface 620 of the mobile terminal 610 comprises at least one switch 10, 20 in the way of the mobile terminal 500 shown in FIG. 5. The mobile terminal 610 may comprise a general controller 12 which may be included in the processor 622 and the memory 626, for example. The mobile terminal 610 may comprise at least one subscriber identification module 102 in at least one card 100. The mobile terminal 610 may be connectable with the accessory 600 through the interface 620. The accessory 600 may comprise the interface 408 with at least one switch 10, 20 and have subscriber identification modules 102B, 100C in cards 100B, 100C and. The mobile terminal 710 may comprise a subscriber identification module controller 14 which may be included in the processor 622 and the memory 626. The mobile terminal 710 may comprise one or more radio modems 16, 18, 22. Because of interfaces 604 and 620 the information between the subscriber identity modules 102, 102B, 102C of the cards 100, 100B, 100C and the radio modems 16, 18, 22 may be transferred in a similar manner to what is explained earlier. The data transfer between the subscriber identity modules 102, 102B, 102C and the radio modems 16, 18, 22 may be performed through the at least one switch 10, 20 in the interface 620.

The instructions 404, when executed by the one or more processors 406 of the mobile terminal 710, may cause the mobile terminal 710 obtain data 440A, 440B, 440C from the at least one subscriber identity module 102, 102B, 102C and control the use of at least one subscriber identity module of a plurality of subscriber identity modules 102, 102B, 102C of at least one operator of wireless communication associated with the at least one card 100, 100B, 100C for wireless communication.

The instructions 404, when executed by the one or more processors 406 of the mobile terminal 710, may cause the mobile terminal 710 to obtain the data 440A, 440B, 440C of the subscriber identity modules 102, 102B, 102C, obtain selection ground 444 for the at least one subscriber identity module, and select at least one optimal subscriber identity module 102, 102B, 102C for use by the mobile terminal 710 on the basis of the data 440A, 440B, 440C of the subscriber identity modules, and the selection ground data 444 for the at least one subscriber identity module. The data 442 relating to a mobile terminal 710 may also be obtained and it may have effect on the selection.

Figure 7B:
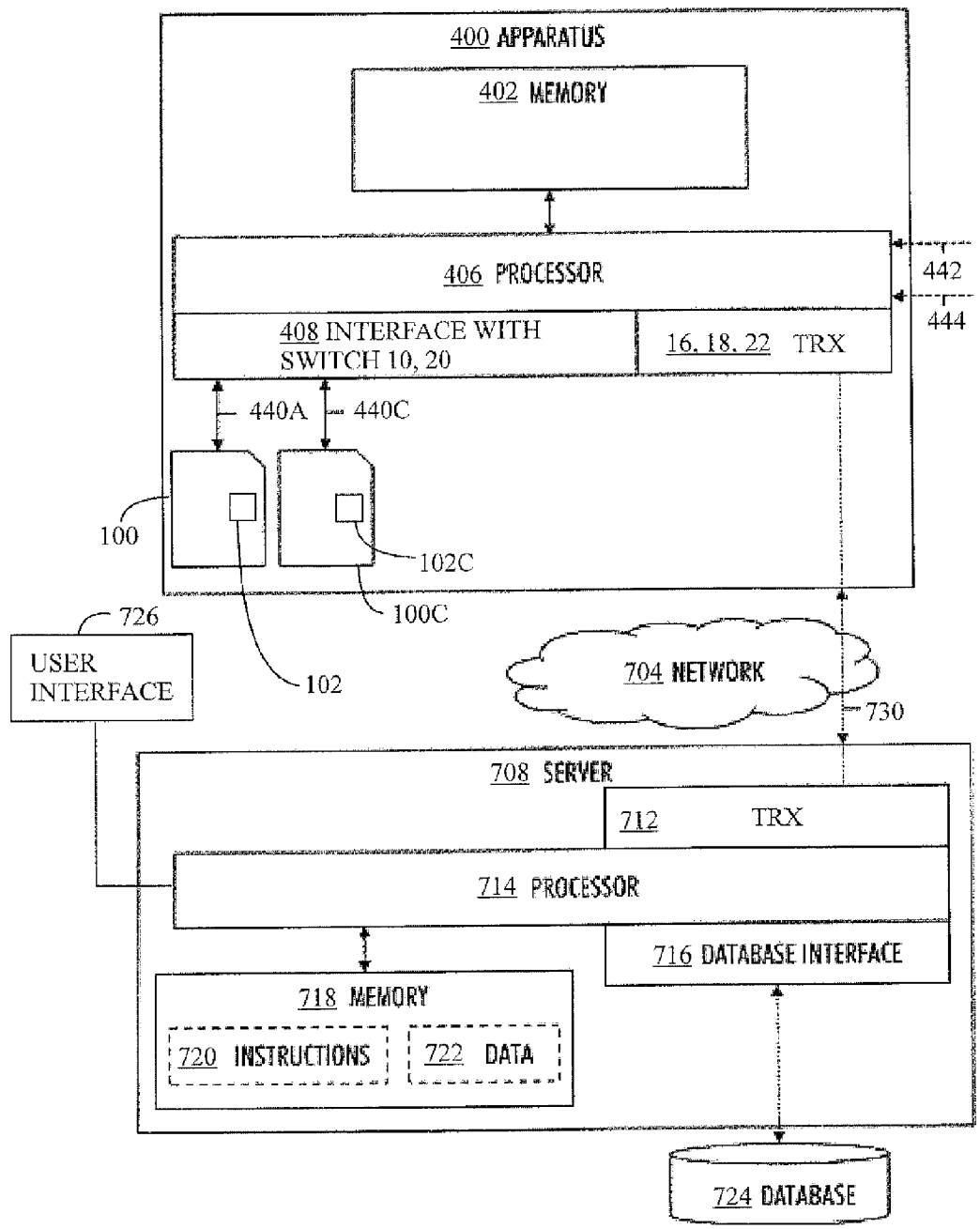
FIG. 7B illustrates a server and its communication with equipment having one or more SIM cards over radio interface.

FIG. 7B illustrates example embodiments, wherein an external server 708 participates in communication relating to the at least one subscriber identity module 102, 102C.

The equipment 400 comprises, as already explained, the SIM interface 408 to the at least one of one subscriber identity module 102, 102C. The SIM interface 408 comprises the at least one switch 10, 20. Furthermore, the equipment 400 may comprise a radio transceiver 16, 18, 22 of a wireless communication system.

Each of the at least switch 10, 20 in the SIM interface 408 may receive control data from the general controller 12 included in the processor 406 and the memory 402. The switch 10 may then switch on or switch off the simultaneous first and second couplings. Correspondingly, the switch 20 may switch on or switch off its simultaneous first and second couplings.

In fact, the equipment 400 illustrated in FIG. 7B may be implemented as in any example embodiment described in FIGS. 3A to 6 and 8. These embodiments include a mobile wireless communications terminal, an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, a Universal Serial Bus USB modem. Consequently, the equipment 400 may communicate 730 with the server 708 either through the accessory 600/800, which then includes a suitable transceiver 16, 18, 22, or through the mobile terminal 610, which includes a suitable transceiver 16, 18, 22.

The server 708 may comprise a transceiver 712 capable of communicating 730 with the at least one equipment 400 through a communication network 704. The communication network 704 may comprise a wireless system.

The server 708 may also comprise one or more processors 714, and one or more memories 718 storing instructions 720. In an example embodiment, the server 708 is a computer, such as a single server computer or a cluster of computers, whereby the one or more processors 714 and the one or more memories 718 may be implemented by suitable processors, even in parallel or multicore embodiments, for example. As shown in FIG. 7B, data 722 relating to the processing may reside on the one or more memories 718. FIG. 7B also shows that the server 708 may comprise a database interface 716 to a database 724 filled with information relating to the at least one security code of the at least one subscriber identity module 102, 102C. The database 724 may reside inside or outside the server 708.

An embodiment of the system in FIG. 7B may comprise at least one equipment 400 and a server 708 of the service provider. The server 708 may store each security code of each subscriber identification module 102, 102C. The server 708 may comprise or may be operably coupled with a wireless transceiver 712 for communicating wirelessly with the at least one equipment 400. In an embodiment, the one or more memories 718 store instructions, that, when executed by the one or more processors 714, cause the server 708 to receive a request, through the wireless transceiver 712, for at least one security code from the at least one apparatus 400. Further, the instructions, that, when executed by the one or more processors 714, cause the server 708 to transmit, through the wireless transceiver 712, at least one security code stored in the database 724 to the at least one apparatus 400 as a response to the received request.

In an embodiment, the one or more memories 718 may store the instructions, when executed by the one or more processors 714, cause the server 708 to obtain an instruction to lock at least one subscriber identification module from the user interface 726, transmit, through the wireless transceiver 712, a service provider's lock command addressed to least one subscriber identification module. Then the equipment 400 may, as a response to the obtained lock command, prevent providing with one or more security codes stored in the one or more memories prior to the lock command for limiting the use of the at least one subscriber identification module associated with the lock command. If the equipment 400 is stolen and the user informs the service provide about the theft, the service provider may start an operation to disable the use of the equipment 400 by locking the at least one SIM 102, 102C.

In an embodiment, the lock command may comprise at least one incorrect security code for at least one subscriber identification module in order to cause a failure in the security code check.

Figure 8:
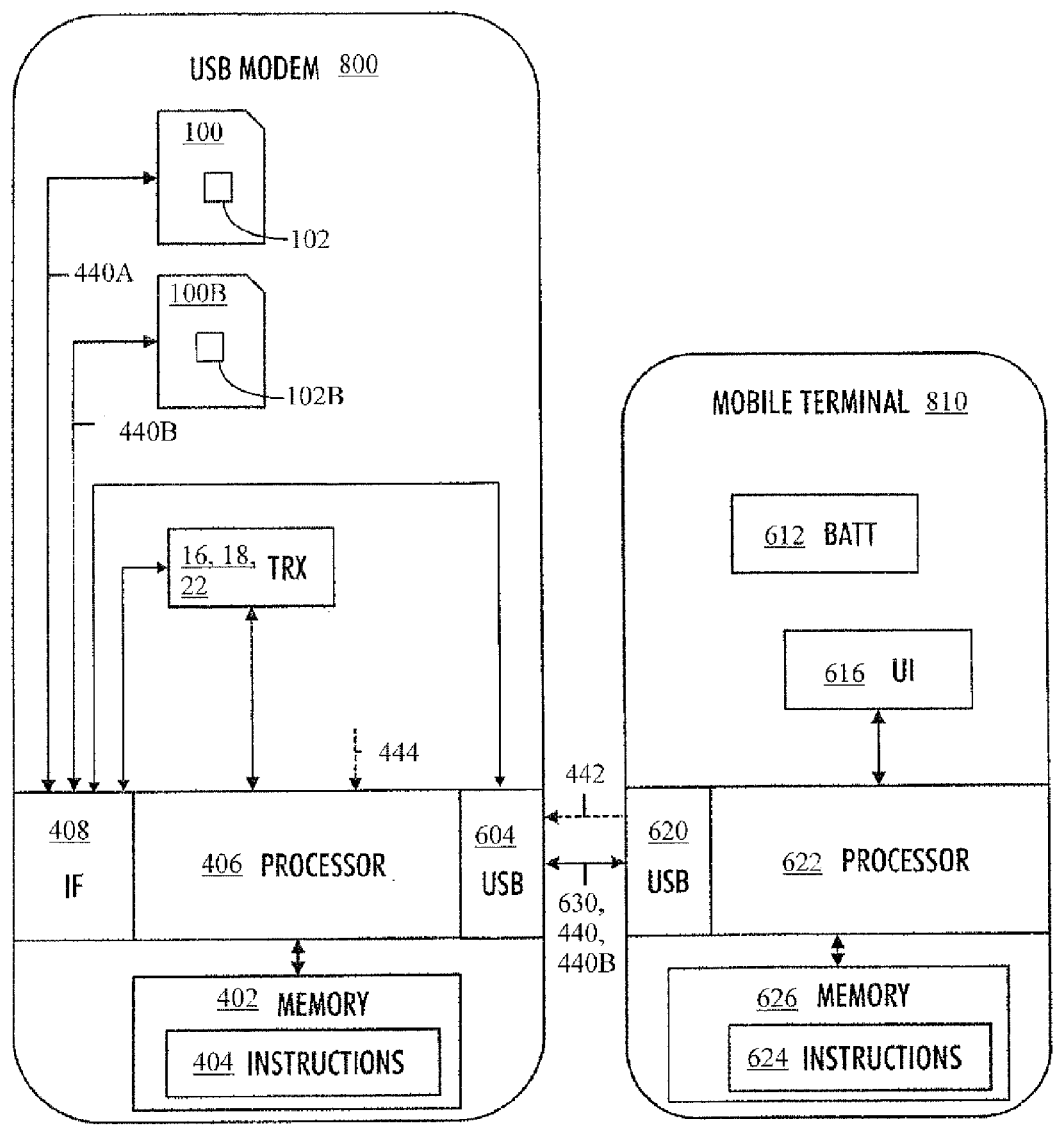
FIG. 8 illustrates a USB modem having at least one SIM card.

FIG. 8 illustrates a further example embodiment wherein the functionality of the equipment 400 of FIG. 4 is implemented in a USB (Universal Serial Bus) modem 800. In this example, the USB modem 800 which may be used as an accessory (like in FIGS. 6 and 7A accessories 600, 700) of a mobile terminal 810. Consequently, the USB modem 800 comprises the at least one the subscriber identity module 102, 102B of the at least one card 100, 100B, the interface 408 associated with the at least one subscriber identity module 102, 102B, the at least one processor 406, and at least one memory 402 with the instructions 404.

The USB modem 800 may or may not comprise a battery, depending on the power requirements of the USB modem 800 and the possibility to obtain electric energy from an external source such as a mobile terminal 810.

Furthermore, the USB modem 800 comprises a USB interface 604 capable of being coupled 630 through a USB cable and appropriate connectors to the interface 620 of the mobile terminal 810. The interface 620 may be a USB interface 620. The data 442 of the mobile terminal 810 may be transferred from the mobile terminal 810 to the USB modem 800 through the interfaces 604, 620.

Each of the at least switch 10, 20 in the SIM interface 408 may receive control data from the general controller 12 included in the processor 406 and the memory 402. The switch 10 may then switch on or switch off the simultaneous first and second couplings. Correspondingly, the switch 20 may switch on or switch off its simultaneous first and second couplings.

In an embodiment, the at least one processor 622 and the memory 626 may comprise the general controller 12 and the subscriber identification module controller 14. Then the connections between the general controller 12 and the subscriber identification module controller 14 with the radio modem of all radio modems 16, 18, 22 and with the at least one subscriber identification modules 102, 102B may be formed through the interfaces 620, 604 and 408.

The instructions 404, when executed by the one or more processors 406 of the USB modem 800, may cause the USB modem 800 obtain data 440A, 440B from the at least one subscriber identity module 102, 102B and control the use of the at least one subscriber identity module of at least one operator of wireless communication associated with the at least one card 100, 100B for wireless communication.

In an embodiment comprising a plurality of subscriber identity modules 102, 102B, the instructions 404, when executed by the one or more processors 406 of the USB modem 800, may cause the USB modem 800 to obtain the data 440A, 440B of the subscriber identity modules 102, 102B, obtain selection ground data 444 for the at least one subscriber identity module, and select at least one optimal subscriber identity module 102, 102B for use by the mobile terminal 810 on the basis of the data 440A, 440B of the subscriber identity modules, and the selection ground data 444 for the at least one subscriber identity module. The data 442 relating to a mobile terminal 810 may also be obtained and it may have effect on the selection.

In an example embodiment, the mobile terminal 810 may be a portable computer, a tablet computer, or any other suitable mobile terminal capable of employing the at least one subscriber identity module 102, 102B but not necessarily itself including a transceiver capable of communicating with a wireless communication system. Consequently, the mobile terminal 810 may only comprise the battery 612 and the user interface 616 of the other parts of the mobile terminal 610 illustrated in FIG. 6.

In the example embodiment of FIG. 8, the equipment 400 of FIG. 4 functionality may be implemented in the USB modem 800 such that the instructions 404 are run in the at least one processor 406 of the USB modem 800. However, also such an example embodiment is feasible wherein a part of the equipment 400 of FIG. 4 functionality may implemented in the mobile terminal 810 as well such that a part of the instructions 404 are also run in at least one processor 422 of the mobile terminal 810 besides the other instructions 624 stored in at least one memory 626 of the mobile terminal 810.

Figure 9:
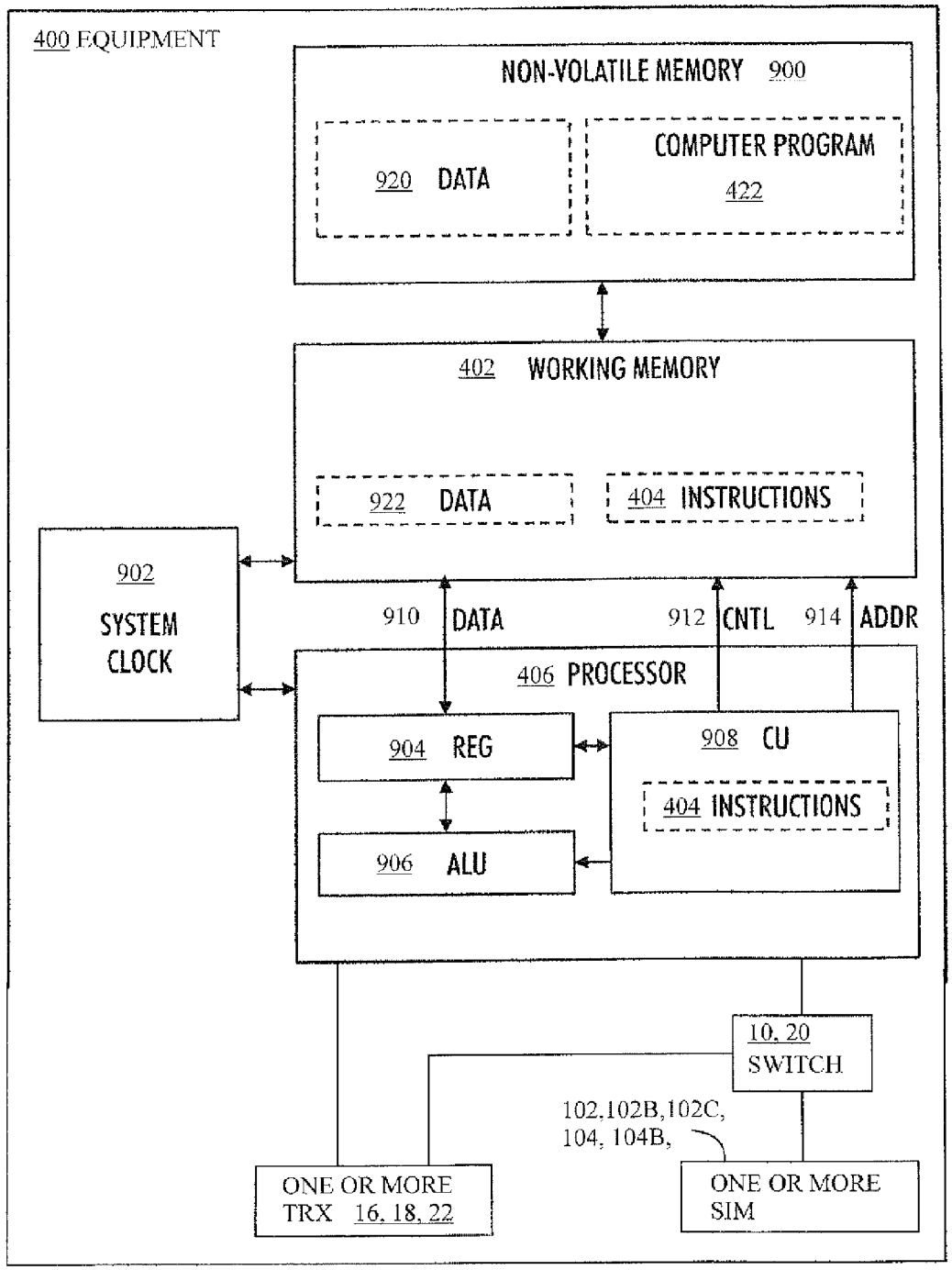
FIG. 9 illustrates the equipment comprising a computer.

FIG. 9 shows an electronic digital computer which is an example of the equipment 400 of FIG. 4. The electronic digital computer, which may comprise, besides the at least one processor 406 and the (working) memory 402, a non-volatile memory 900, and a system clock 902. Naturally, the computer may comprise a number of other peripheral devices, not illustrated here for the sake of clarity.

In an example embodiment, the system clock 902 constantly generates a regular stream of electrical pulses, which cause the various transferring operations within the computer to take place in an orderly manner and with deterministic timing.

In an example embodiment, the at least one processor 406 may be implemented as a microprocessor implementing functions of a central processing unit (CPU) on an integrated circuit. The CPU is a logic state machine executing a computer program 422, which comprises the program instructions 404. The instructions 104 may be coded as a computer program using a programming language, which may be a high-level programming language, such as C, or Java, or a low-level programming language, such as a machine language, or an assembler. The CPU may comprise a set of registers 904, an arithmetic logic unit (ALU) 906, and a control unit (CU) 908. The control unit 908 is controlled by a sequence of instructions 404 transferred to the CPU from the working memory 402. The control unit 908 may contain a number of microinstructions for basic operations. The implementation of the microinstructions may vary, depending on the CPU design. The microprocessor 406 may also have an operating system (a dedicated operating system of an embedded system, or a real-time operating system), which may provide the computer program 422 with system services.

In an example embodiment, there may be three different types of buses between the working memory 402 and the at least one processor 406: a data bus 910, a control bus 912, and an address bus 914. The control unit 908 uses the control bus 912 to set the working memory 402 in two states, one for writing data into the working memory 402, and the other for reading data from the working memory 402. The control unit 908 uses the address bus 914 to send to the working memory 402 address signals for addressing specified portions of the memory in writing and reading states. The data bus 910 is used to transfer data 922, such as data 440A, 440B, 440C, 442, 444 between the working memory 402 to the at least one processor 406, and to transfer the instructions 404 from the working memory 402 to the at least one processor 406. During running of the program 422, the instructions 404 may be transferred via the data bus 910 from the working memory 402 into the control unit 908, wherein usually a portion of the instructions 404 resides and controls the operation of the equipment 400 of FIG. 4.

In an example embodiment, the working memory 402 may be implemented as a random-access memory (RAM), where the information is lost after the power is switched off. The RAM is capable of returning any piece of data in a constant time, regardless of its physical location and whether or not it is related to the previous piece of data. The data may comprise data 440A, 440B, 440C, 442, 444 and any other permanent or temporary data needed during the processing, program instructions etc.

In an example embodiment, the non-volatile memory 900 retains the stored information even when not powered. Examples of non-volatile memory include read-only memory (ROM), flash memory, magnetic computer storage devices such as hard disk drives, and optical discs. As is shown in FIG. 9, the non-volatile memory 900 may store both data 920 and the computer program 422 comprising the instructions 404.

In principle, what is written about the at least one processor 406 and the memories above is true for the at least one processor 200 and the memories 202 of a SIM irrespective of whether they are real or virtual.

Each of the at least switch 10, 20 in the SIM interface 408 may receive control data from the general controller 12 included in the processor 406 and the memory 402. The switch 10 may then switch on or switch off the simultaneous first and second couplings. Correspondingly, the switch 20 may switch on or switch off its simultaneous first and second couplings.

An example embodiment of a plurality of subscriber identity modules 102, 102B provides a computer program 422 comprising the instructions 404 which, when loaded 426 into the equipment 400 of FIG. 4, may cause the equipment 400 of FIG. 4 to obtain data 440A, 440B of the subscriber identity modules 102, 102B in cards 100, 100B, obtain selection ground data 444 associated with the at least one subscriber identity module, and select at least one optimal subscriber identity module 102, 102B for use by the mobile terminal on the basis of the data 440A, 440B of the subscriber identity modules, and the selection ground data 444 for the subscriber identity module. The data 442 relating to a mobile terminal may also be obtained and it may have effect on the selection.

In an example embodiment, the computer program 422 may be in source code form, object code form, or in some intermediate form. The computer program 422 may be stored in a carrier 420, which may be any entity or device capable of carrying the program 422 to the equipment 400 of FIG. 4. The carrier 420 may be a computer-readable storage medium. Besides this, the carrier 420 may be implemented as follows, for example: the computer program 422 may be embodied on a record medium, stored in a computer memory, embodied in a read-only memory, and/or embodied on a software distribution medium. The carrier 420 may also be carried on the telecommunications signal. The medium 420 may be a non-transitory computer-readable storage medium.

FIG. 4 illustrates an example embodiment in which the carrier 420 may be coupled 426 with the equipment 400 of FIG. 4, whereupon the program 422 comprising the instructions 404 is transferred into the (working) memory 402, and possibly also into the non-volatile memory 900. The program 422 with its instructions 404 may be loaded from the non-volatile memory 900 into the working memory 402 as needed.

Figure 10:
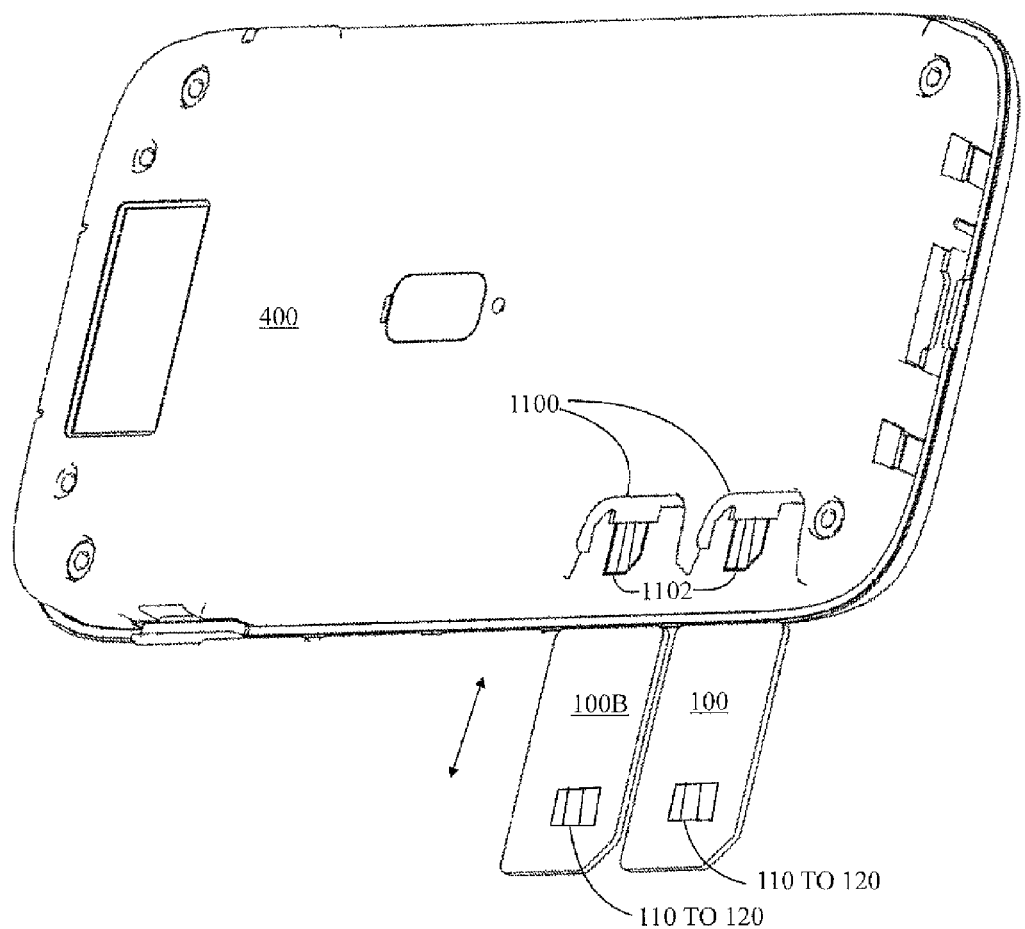
FIG. 10 illustrates a mechanical structure of the equipment.

FIG. 10 presents mechanics of the equipment 400 associated with wireless communication. The equipment 400 may be the mobile terminal 500, 610, 710, 810, the accessory 600, 700 or the USB modem 800. The equipment 400 may also comprise pockets 1100 for the at least one card 100, 100B.

The number of pockets may be one or more. The pockets 1100 may be arranged parallel or in some other manner in the equipment 400.

Each pocket 1100 may have an empty space the size and shape of which may closely correspond to those of the card 100, 100B, 100C, 100D, 100E. Each pocket 1100 has electrical contact electrodes 1102 for coupling with contact pads 110 to 120 of the card 100, 100B. The electrical contact electrodes 1102 are in electrical connection with the operational circuitry of the card 100, 100B, 100C, 100D, 100E. The at least one card 100, 100B, 100C, 100D, 100E is removably attachable to the equipment.

The equipment 400 may be made thin and pocked sized and the equipment 400 may thus also be portable like present mobile phones, for example. Here thin means a thickness of less than about 2.5 cm, and often 0.5 cm to 2 cm. Other dimensions of the equipment 400 are defined by the outer structures and they may be about 5 cm to 20 cm×4 cm to 15 cm, for example. The equipment 400 may comprise or may be made of plastic, composite, ceramics or metal, for example.

In an embodiment, the one or more memories may store instructions, that, when executed by the one or more processors, may cause the general controller 16 to obtain data of availability of at least one subscriber identity module 102, 102B, 102C, 104, 104B, 302 to 306, 302B to 306B. The instructions, when executed by the one or more processors, may cause the general controller 16 to form the control data on the basis of the data of the availability of the at least one subscriber identity module 102, 102B, 102C, 104, 104B.

When a subscriber identity module 102, 102B, 102C, 104, 104B is inserted in a pocket 1100 of the equipment 400, the general controller 12 may receive a signal from the contact electrodes 1102 that a subscriber identity module 102, 102B, 102C, 104, 104B is available.

FIG. 11 illustrates an example of a possible signalling diagram of a communication procedure between the mobile phone, the accessory and a plurality of subscriber identification modules.

In an example embodiment, the one or more memories 402 further store instructions 404, that, when executed by the one or more processors 406, cause the equipment 400 to treat one of the subscriber identity modules 102C as the default subscriber identity module and to use the default subscriber identity module 102C after start-up of the mobile terminal. The default subscriber identity module 102C may, besides being the starting subscriber identity module, be also the controlling subscriber identity module, and possibly also be the back-up subscriber identity module. In FIG. 11, the mobile terminal 610 uses 1200 the default SIM 102C for communication.

The use of the default SIM 102C includes that the SIM 102C requests the equipment 400 for at least one security code. The request for the at least one security code may performed by requesting a PIN from the equipment 400. In the example of FIG. 11 the accessory 600 receives the request and responds to the request automatically by outputting a suitable PIN for the SIM 102C such that the user doesn't need to respond. In an embodiment, the user intervention is blocked. The user doesn't receive the request since it is not mediated to the user interface. Hence, the user may not be allowed to input the PIN or any security code that is requested by any SIM. The SIM which is requesting a PIN may also output data on its unique identification with the request. The data on the identification may be used to determine the suitable PIN to be included in the response from among a plurality of PINs of other SIMs stored in the one or more memories 402 of the equipment 400.

In an example embodiment, the one or more memories 402 further store instructions 404, that, when executed by the one or more processors 406, cause the equipment 400 to detect roaming of the mobile terminal, and to initiate said selection of the at least one optimal subscriber identity module 102, 102C, 104, 104B for use by the mobile terminal. The subscriber identity module 102B has not been shown for clarity, but it may be included in the selection. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures. If the visited network is in the same country as the home network, this is known as National Roaming. If the visited network is outside the home country, this is known as International (or Global) Roaming. If the visited network operates on a different technical standard than the home network, this is known as Inter-standard roaming. GSM Coverage Maps is a unique resource containing information supplied and approved by the members of the GSM Association. Network, services and roaming information are continually updated to reflect the evolving situation worldwide.

The accessory 600 may inactivate 1202 the mobile terminal 610, and scan 1204, 1206, 1208 SIM data from the at least one more subscriber identity module 102, 102C, 104, 104B that may be located in the accessory 600. The scan 1204, 1206, 1208 refers to data 440A, 440B, 440C which includes identification of the at least one SIM 102 to 106. The identification may refer to subscriber-identity-module-specific data or a separate and unique serial number of a SIM given by the service provider. The scan 1204, 1206, 1208 includes that the at least one SIM 102, 102C, 104, 104B requests the equipment 400 for at least one security code for the at least one SIM 102, 102C, 104, 104B. Each request for the at least one security code may performed by requesting a PIN of each SIM from the equipment 400. In the example of FIG. 12 the accessory 600 receives the at least one request and responds to the at least one request automatically by outputting one or more suitable PINs for the at least one SIM 102, 102C, 104, 104B such that the user doesn't need to respond. In an embodiment, the user intervention is blocked. The user doesn't receive the at least one request since the at least one request is not mediated to the user interface. Hence, the user may not input the at least one PIN or any security code that is requested by any SIM. The SIM which is requesting a PIN may also output data on its unique identification with the request. The data on the identification may be used to determine the suitable PIN to be included in the response from among a plurality of PINs of other SIMs stored in the one or more memories 402 of the equipment 400.

Next, the accessory 600 may ask 1210 for available networks from the mobile terminal 610, whereupon the mobile terminal 610 may return 1212 data on the available networks to the accessory 600. The accessory 600 may then select 1214 at least one optimal subscriber identity module 102, 102C, 104, 104B for use by the mobile terminal as the active SIM on the basis of the data 1204, 1206, 1208 relating to the subscriber identity modules 102, 102C, 104, 104B, the data 1212 relating to the mobile terminal 610, and the at least one selection ground for the subscriber identity module. In our example, SIM-2 104 may be selected 1214 as the active SIM, whereupon the accessory 600 may instruct 1216 the mobile terminal 610 to reconnect network with the optimal active subscriber identity module 104.

FIG. 12 illustrates a flow chart of a method. At least one switch is connected with a general controller, a plurality of subscriber identification modules, a subscriber identification module controller, and one or more radio modems, each of the one or more radio modems being capable of communicating wirelessly with at least one base station of a radio system. In step 1300, control data from the general controller is received by each switch. In step 1302, one or more first couplings and one or more second couplings are regulated simultaneously by each switch on the basis of the control data, the one or more first couplings being formed between one or more subscriber identification modules and the subscriber identification module controller and the one or more second couplings being formed between one or more subscriber identification modules and the radio modems.

Wireless communication devices develop rapidly. Therefore, all words and expressions should be interpreted broadly and they are intended to illustrate, not to restrict, the embodiments presented above. It will be obvious to a person skilled in the art that, as technology advances, the inventive concept can be implemented in various ways. The invention and its embodiments are not limited to the examples described above but may vary within the scope of the claims.

The invention claimed is:

1. A switch operably couplable with a general controller, a plurality of subscriber identification modules, a subscriber identification module controller, and one or more radio modems, each of the one or more radio modems being configured to wirelessly communicate with at least one base station of a radio system;

the switch being configured to receive control data from the general controller;

the switch being capable of regulating, on the basis of the control data, one or more first couplings and one or more second couplings simultaneously, the one or more first couplings being formed between one or more of the subscriber identification modules and the subscriber identification module controller and the one or more second couplings being formed between one or more of the subscriber identification modules and the radio modems;

the switch being configured, on the basis of control data at a first moment, to form couplings simultaneously between P of the subscriber identification modules and at least one of the one or more radio modems, and between R of the subscriber identification modules and the subscriber identification module controller; and the switch being configured, on the basis of different control data at another moment, to form couplings between Q of the subscriber identification modules and one or more of the one or more radio modems, the one or more radio modems being the same as or different from said at least one radio modem of the first moment, and between T of the subscriber identification modules and the subscriber identification module controller, the P subscriber identification modules being different from the R subscriber identification modules for security checking the R subscriber identification modules in the subscriber identification module controller while using the P subscriber identification modules and the at least one radio modem of the first moment for wireless communication, the Q subscriber identification modules being different from the T subscriber identification modules, and the Q subscriber identification modules being at least partly different from the P subscriber identification modules, where P, Q, R and T are whole numbers larger than zero.

2. The switch of claim 1, wherein the switch is configured to form a coupling between at least one of the subscriber identification modules and the at least one radio modem for transferring data to the at least one radio modem from the at least one subscriber identification module in order to enable a wireless communication between the at least one radio modem and the at least one base station, the data transferred through the switch relating to at least one of the following: a user of the apparatus; and the wireless communication.

3. The switch of claim 1, wherein the switch is configured to switch on or off at least one coupling between a subscriber identification module and at least one radio modem and the subscriber identification controller on the basis of the control data comprising a command and address data, the address data determining the coupling to be switched on or switched off.

4. A portable apparatus comprising:
at least one switch of claim 1;
the general controller;
one or more of the subscriber identification modules;
the subscriber identification module controller; and
the one or more radio modems,
the at least one switch being operably coupled with the general controller, the one or more subscriber identification modules, the subscriber identification module controller, and the one or more radio modems.

5. The apparatus of claim 4, wherein each of the at least switch is configured to form a coupling between at least one subscriber identification module and the at least one radio modem;
the at least one of the subscriber identification modules and the at least one radio modem being configured to transfer data to the at least one radio modem from the at least one subscriber identification module, and the at least one radio modem being configured to perform a wireless communication with at least one base station on the basis of the data transferred through the switch, the transferred data relating to at least one of the following: a user of the apparatus; and the wireless communication.

6. The apparatus of claim 4, wherein the instructions, when executed by the one or more processors, cause the general controller to: obtain data of availability of one or more of the subscriber identification modules, and form the control data on the basis of the data of the availability of the one or more of the subscriber identification modules.

7. The apparatus of claim 4, wherein the general controller comprises one or more processors and one or more memories;
the one or more memories being configured to store instructions, that, when executed by the one or more processors, cause the general controller to: form the control data, and feed the control data to the switch for regulating, on the basis of the control data, one or more first couplings and one or more second couplings simultaneously, the one or more first couplings being formed between one or more of the subscriber identification modules and the subscriber identification module controller, and the one or more second couplings being formed between one or more of the subscriber identification modules and the radio modems.

8. The apparatus of claim 7, wherein the control data is configured to define the at least coupling by
the data from the one or more of the subscriber identification modules which includes subscriber identification-module-specific data for uniquely identifying each of the one or more subscriber identification modules available and addressing each subscriber identification module separately; and
a radio-modem-specific data which is included in the control data and which is configured to uniquely identify each of the one or more radio modems.

9. The apparatus of claim 7, wherein the one or more memories are configured to store instructions, that, when executed by the one or more processors, cause the subscriber identification module controller to: obtain selection ground data associated with the subscriber identification modules, select at least one optimal subscriber identification module for use by the mobile terminal on the basis of the data of the subscriber identification modules and the selection ground data for the subscriber identification modules, form the control data for the selected at least one subscriber identification module, and feed the control data to the switch for regulating, on the basis of the control data, one or more first couplings and one or more second couplings simultaneously, the one or more first couplings being formed between one or more subscriber of the identification modules and the subscriber identification module controller and the one or more second couplings being formed between one or more of the subscriber identification modules and the radio modems.

10. A method, wherein at least one switch is connected with a general controller, a plurality of subscriber identification modules, a subscriber identification module controller, and one or more radio modems, each of the one or more radio modems being capable of communicating wirelessly with at least one base station of a radio system, the method comprising:
receiving, by each of the at least one switches, control data from the general controller;
regulating, by each of the at least one switches on the basis of the control data, one or more first couplings and one or more second couplings simultaneously, the one or more first couplings being formed between one or more of the subscriber identification modules and the subscriber identification module controller, and the one or more second couplings being formed between one or more of the subscriber identification modules and the radio modems,
the at least one switch being configured, on the basis of control data at a first moment, to form couplings simultaneously between P of the subscriber identification modules and at least one of the one or more radio modems, and between R of the subscriber identification modules and the subscriber identification module controller,
the at least one switch being configured, on the basis of different control data at another moment, to form couplings between Q of the subscriber identification modules and one or more of the one or more radio modems, the one or more radio modems being the same as or different from said at least one radio modem of the first moment, and between T of the subscriber identification modules and the subscriber identification module controller,
the P subscriber identification modules being different from the R subscriber identification modules for security checking the R subscriber identification modules in the subscriber identification module controller while using the P subscriber identification modules and the at least one radio modem of the first moment for wireless communication, the Q subscriber identification modules being different from the T subscriber identification modules, and the Q subscriber identification modules being at least partly different from the P subscriber identification modules, where P, Q, R and T are whole numbers larger than zero.

* * * * *